United States Patent [19]

White et al.

[11] Patent Number: 5,632,023

[45] Date of Patent: May 20, 1997

[54] SUPERSCALAR MICROPROCESSOR INCLUDING FLAG OPERAND RENAMING AND FORWARDING APPARATUS

[75] Inventors: Scott A. White; David S. Christie; Michael D. Goddard, all of Austin, Tex.

[73] Assignee: Advanced Micro Devices, Inc., Sunnyvale, Calif.

[21] Appl. No.: 252,029

[22] Filed: Jun. 1, 1994

[51] Int. Cl.[6] ............................................. G06F 9/30
[52] U.S. Cl. ........................ 395/394; 395/800; 395/391
[58] Field of Search ..................... 364/DIG. 1 MS File, 364/DIG. 2 MS File; 395/375, 800

[56] References Cited

U.S. PATENT DOCUMENTS

| | | | |
|---|---|---|---|
| 4,490,908 | 1/1985 | Tran | 30/90.4 |
| 4,736,288 | 4/1988 | Shintani et al. | 364/200 |
| 4,807,115 | 2/1989 | Torng | 364/200 |
| 5,053,631 | 10/1991 | Perlman et al. | 364/748 |
| 5,056,006 | 10/1991 | Acharya et al. | 395/425 |
| 5,058,048 | 10/1991 | Gupta et al. | 364/748 |
| 5,077,692 | 12/1991 | McMinn | 365/230.06 |
| 5,095,458 | 3/1992 | Lynch et al. | 364/787 |
| 5,128,888 | 7/1992 | Tamura et al. | 364/748 |
| 5,128,891 | 7/1992 | Lynch et al. | 364/767 |
| 5,129,067 | 7/1992 | Johnson | 395/375 |
| 5,136,697 | 8/1992 | Johnson | 395/375 |
| 5,157,780 | 10/1992 | Stewart et al. | 395/183.07 |
| 5,185,868 | 2/1993 | Tran | 395/375 |
| 5,206,828 | 4/1993 | Shah et al. | 364/784 |
| 5,226,126 | 7/1993 | McFarland et al. | 395/375 |
| 5,226,130 | 7/1993 | Favor et al. | 395/375 |
| 5,237,700 | 8/1993 | Johnson et al. | 395/775 |
| 5,247,644 | 9/1993 | Johnson et al. | 395/484 |
| 5,251,306 | 10/1993 | Tran | 395/375 |

FOREIGN PATENT DOCUMENTS 2281422   3/1995   United Kingdom.

OTHER PUBLICATIONS

Mike Johnson, "Superscalar Microprocessor Design". (Prentice Hall series in innovative technology), 1991. (* On Deposit in Group 2300 Library, Copy Supplied by Assignee).

R.M. Tomasulo, "An Efficient Algorithm for Exploiting Multiple Arithmetic Units[1], Part 2 Regions of Computer Space, Section 3 Concurrency: Single-Processor System", IBM Journal, vol. 11, Jan. 1967, pp. 293-305.

D.W. Anderson, F.J. Sparacio, F.M. Tomasulo, "The IBM System/360 Model 91: Machine Philosophy and Instruction-handling[1]", Chapter 18, Part 2 Regions of Computer Space, Section 3 Concurrency: Single-Processor System, IBM Journal, vol. 11, Jan. 1967, pp. 276-292.

(List continued on next page.)

*Primary Examiner*—Robert B. Harrell
*Attorney, Agent, or Firm*—Skjerven, Morrill, MacPherson, Franklin & Friel

[57] ABSTRACT

A superscalar microprocessor is provided with a reorder buffer for storing the speculative state of the microprocessor and a register file for storing the real state of the microprocessor. A flags register stores the real state of flags that are updated by flag modifying instructions which are executed by the functional units of the microprocessor. To enhance the performance of the microprocessor with respect to conditional branching instructions, the reorder buffer includes a flag storage area for storing flags that are updated by flag modifying instructions. The flags are renamed to make possible the earlier execution of branch instructions which depend on flag modifying instructions. If a flag is not yet determined, then a flag tag is associated with the flag storage area in place of that flag until the actual flag value is determined. A flag operand bus and a flag tag bus are provided between the flag storage area and the branching functional unit so that the requested flag or flag tags are provided to instructions which are executed in the branching functional unit.

50 Claims, 14 Drawing Sheets

OTHER PUBLICATIONS

U.S. Patent Application Serial No. 07/929,770 filed Apr. 12, 1992 entitled "Instruction Decoder and Superscalar Processor Utilizing Same"—David B. Witt and William M. Johnson.

Gurdindar S. Sohi, "Instruction Issue Logic for High–Performance Interruptible, Multiple Functional Unit, Pipelined Computers", IEEE Transactions on Computers, vol. 39, No. 3, 0©1990, pp. 349–359.

Bruce D. Lightner and Gene Hill, "The Metaflow Lightning Chipset", IEEE Proceedings ConpCom Spring '91, Feb. 1991, pp. 13–18.

R.M. Tomasulo, "An Efficient Algorithm for Exploiting Multiple Artithmetic Units", IBM Journal, Jan. 1967, vol. 11, pp. 25–32.

Key to FIG. 5

| FIG. 5A | FIG. 5B |

SUPERSCALAR MICROPROCESSOR INCLUDING FLAG OPERAND RENAMING AND FORWARDING APPARATUS

CROSS REFERENCE TO RELATED PATENT APPLICATIONS

This patent application is related to copending U.S. patent application Ser. No. 08/146,382, filed Oct. 29, 1993 by David B. Witt and William M. Johnson, entitled "High Performance Superscalar Microprocessor", still pending the disclosure of which is incorporated herein by reference. The cited patent application has the same assignee as the subject patent application.

BACKGROUND OF THE INVENTION

This invention relates in general to microprocessors and, more particularly, to high performance superscalar microprocessors.

Types of Microprocessors

Like many other modern technical disciplines, microprocessor design is a technology in which engineers and scientists continually strive for increased speed, efficiency and performance. Generally speaking, microprocessors can be divided into two classes, namely scalar and vector processors. An elementary scalar processor processes a maximum of one instruction per machine cycle. So called "superscalar" processors can process more than one instruction per machine cycle. In contrast with the scalar processor, a vector processor can process a relatively large array of values in a short amount of time.

Vector processors rely on data parallelism to achieve processing efficiencies whereas superscalar processors rely on instruction parallelism to achieve increased operational efficiency. Instruction parallelism may be thought of as the inherent property of a sequence of instructions which enable such instructions to be processed in parallel. In contrast, data parallelism may be viewed as the inherent property of a stream of data which enables the elements thereof to be processed in parallel. Instruction parallelism is related to the number of dependencies which a particular sequence of instructions exhibits. Dependency is defined as the extent to which a particular instruction depends on the result of another instruction. In a scalar processor, when an instruction exhibits a dependency on another instruction, the dependency generally must be resolved before the instruction can be passed to a functional unit for execution. For this reason, conventional scalar processors experience undesirable time delays while the processor waits pending resolution of such dependencies.

Pipelining

Several approaches have been employed over the years to speed up the execution of instructions by processors and microprocessors. One approach which is still widely used in microprocessors today is pipelining. In pipelining, an assembly line approach is taken in which the three microprocessor operations of 1) fetching the instruction, 2) decoding the instruction and gathering the operands, and 3) executing the instruction and writeback of the result, are overlapped to speed up processing. In other words, instruction 1 is fetched and instruction 1 is decoded in respective machine cycles. While instruction 1 is being decoded and its operands are gathered, instruction 2 is fetched. While instruction 1 is being executed and the result written, instruction 2 is being decoded and its operands are gathered, and instruction 3 is being fetched. In actual practice, the assembly line approach may be divided into more assembly line stations than described above. A more in-depth discussion of the pipelining technique is described by D. W. Anderson et al. in their publication "The IBM System/360 Model 91: Machine Philosophy", IBM Journal, Vol. 11, January 1967, pp. 8–24.

The following definitions are now set forth for the purpose of promoting clarity in this document. "Dispatch" is the act of sending an instruction from the instruction decoder to a functional unit. "Issue" is the act of placing an instruction in execution in a functional unit. "Completion" is achieved when an instruction finishes execution and the result is available. An instruction is said to be "retired" when the instruction's result is written to the register file. This is also referred to as "writeback".

Superscalar Microprocessors

The recent book, Superscalar Microprocessor Design, William Johnson, 1991, Prentice-Hall, Inc., describes several general considerations for the design of practical superscalar microprocessors. FIG. 1 is a block diagram of a microprocessor 10 which depicts the implementation of a superscalar microprocessor described in the Johnson book. Microprocessor 10 includes an integer unit 15 for handling integer operations and a floating point unit 20 for handling floating point operations. Integer unit 15 and floating point unit 20 each include their own dedicated instruction decoder, register file, reorder buffer, and load/store units. More specifically, integer unit 15 includes instruction decoder 25, a register file 30, a reorder buffer 35, and load and store units (60 and 65), while floating point unit 20 includes its own instruction decoder 40, register file 45, reorder buffer 50, and load and store units (75 and 80) as shown in FIG. 1. The reorder buffers contain the speculative state of the microprocessor, whereas the register files contain the architectural or real state of the microprocessor.

Microprocessor 10 is coupled to a main memory 55 which may be thought of as having two portions, namely an instruction memory 55A for storing instructions and a data memory 55B for storing data. Instruction memory 55A is coupled to both integer unit 15 and floating point unit 20. Similarly, data memory 55B is coupled to both integer unit 15 and floating point unit 20. In more detail, instruction memory 55A is coupled to decoder 25 and decoder 40 via instruction cache 58. Data memory 55B is coupled to load functional unit 60 and store functional unit 65 of integer unit 15 via a data cache 70. Data memory 55B is also coupled to a floating point load (float load) functional unit 75 and a floating point store (float store) functional unit 80 of floating point unit 20 via data cache 70. Load unit 60 performs the conventional microprocessor function of loading selected data from data memory 55B into integer unit 15, whereas store unit 70 performs the conventional microprocessor function of storing data from integer unit 15 in data memory 55B.

A computer program includes a sequence of instructions which are to be executed by microprocessor 10. Computer programs are typically stored in a hard disk, floppy disk or other non-volatile storage media which is located in a computer system. When the program is run, the program is loaded from the storage media into main memory 55. Once the instructions of the program and associated data are in main memory 55, the individual instructions can be prepared for execution and ultimately be executed by microprocessor 10.

After being stored in main memory 55, the instructions are passed through instruction cache 58 and then to instruction decoder 25. Instruction decoder 25 examines each instruction and determines the appropriate action to take. For example, decoder 25 determines whether a particular instruction is a PUSH, POP, LOAD, AND, OR, EX OR, ADD, SUB, NOP, JUMP, JUMP on condition (BRANCH) or other type of instruction. Depending on the particular type of instruction which decoder 58 determines is present, the instruction is dispatched to the appropriate functional unit. In the superscalar architecture proposed in the Johnson book, decoder 25 is a multi-instruction decoder which is capable of decoding 4 instructions per machine cycle. It can thus be said that decoder 58 exhibits a bandwidth which is four instructions wide.

As seen in FIG. 1, an OP CODE bus 85 is coupled between decoder 25 and each of the functional units, namely, branch unit 90, arithmetic logic units 95 and 100, shifter unit 105, load unit 60 and store unit 65. In this manner, the OP CODE for each instruction is provided to the appropriate functional unit.

Departing momentarily from the immediate discussion, it is noted that instructions typically include multiple fields in the following format: OP CODE, OPERAND A, OPERAND B, DESTINATION REGISTER. For example, the sample instruction ADD A, B, C would mean ADD the contents of register A to the contents of register B and place the result in the destination register C. Not only must the OP CODE for a particular instruction be provided to the appropriate functional unit, but also the designated OPERANDS for that instruction must be retrieved and sent to the functional unit. If the value of a particular operand has not yet been calculated, then that value must be first calculated and provided to the functional unit before the functional unit can execute the instruction. For example, if a current instruction is dependent on a prior instruction, the result of the prior instruction must be determined before the current instruction can be executed. This situation is referred to as a dependency in that the execution of one instruction is dependent on the execution of another instruction.

The operands which are needed for a particular instruction to be executed by a functional unit are provided by either register file 30 or reorder buffer 35 to operand bus 110. Operand bus 110 is coupled to each of the functional units. Thus, operand bus 110 conveys the operands to the appropriate functional unit. In actual practice, operand bus 110 includes separate buses for OPERAND A and OPERAND B.

Once a functional unit is provided with the OP CODE and OPERAND A and OPERAND B, the functional unit executes the instruction and places the result on a result bus 115 which is coupled to the output of all of the functional units and to reorder buffer 35 (and to the respective reservation stations at the input of each functional unit as will now be discussed).

Reservation Stations

The input of each functional unit is provided with a "reservation station" for storing OP codes and operands from instructions which are not yet complete in the sense that all the operands for that instruction are not yet available to the functional unit. The reservation station also provides for OP CODE and operand storage in the event that a result bus is not yet free. More particularly, the reservation station stores the instruction's OP CODE together with operand tags which reserve places for the missing operands that will arrive at the reservation station later. This technique enhances performance by permitting the microprocessor to continue executing other instructions while the pending instruction is being assembled together with its operands at the reservation station. As seen in FIG. 1, branch unit 90 is equipped with a reservation station 90R; ALU's 95 and 100 are equipped with reservation stations 95R and 100R, respectively; shifter unit 105 is equipped with a reservation station 105R; load unit 60 is equipped with a reservation station 60R; and store unit 65 is equipped with a reservation station 65R. In this approach, reservation stations are employed in place of the input latches which were typically used at the inputs of the functional units in earlier microprocessors. The classic reference with respect to reservation stations is R. M. Tomasulo, "An Efficient Algorithm For Exploiting Multiple Arithmetic Units" IBM Journal, Volume 11, January 1967, pp. 25–33.

As mentioned earlier, a pipeline can be used to increase the effective throughput in a scalar microprocessor up to a limit of one instruction per machine cycle. In the superscalar microprocessor shown in FIG. 1, multiple pipelines are employed to achieve the processing of multiple instructions per machine cycle.

The Reorder Buffer and Register Renaming

Another technique referred to as "register renaming" can also be employed to enhance superscalar microprocessor throughput. This technique is useful in the situation where two instructions in an instruction stream both require use of the same register, for example a hypothetical register 1. A second register called register 1A is allocated for use by the second instruction in place of register 1. In this manner, the second instruction can be executed and a result can be obtained without waiting for the first instruction to be done using register 1. The superscalar microprocessor 10 shown in FIG. 1 uses a register renaming approach to increase instruction handling capability. The manner in which register renaming is implemented in microprocessor 10 is now discussed in more detail.

From the above, it is seen that register renaming eliminates storage conflicts for registers. To implement register renaming, integer unit 15 and floating point unit 20 are associated with respective reorder buffers 35 and 50. For simplicity, only register renaming via reorder buffer 35 in integer unit 15 will be discussed, although the same discussion applies to similar circuitry in floating point unit 20.

Reorder buffer 35 includes a number of storage locations which are dynamically allocated to instruction results. More specifically, when an instruction is decoded by decoder 25, the result value of the instruction is assigned a location in reorder buffer 35 and its destination register number is associated with this location. This effectively renames the destination register number of the instruction to the reorder buffer location. A tag, or temporary hardware identifier, is generated by the microprocessor hardware to identify the result. This tag points to the assigned reorder buffer location for the result value. When a later instruction in the instruction stream refers to the renamed destination register, in order to obtain the value considered to be stored in the register, the instruction instead obtains the value stored in the reorder buffer or the tag for this value if the value has not yet been computed.

Reorder buffer 35 is implemented as a first-in-first-out (FIFO) circular buffer which is a content-addressable memory. This means that an entry in reorder buffer 35 is identified by specifying something that the entry contains, rather than by identifying the entry directly. More particularly, the entry is identified by using the register number that is written into it. When a register number is presented to reorder buffer 35, the reorder buffer provides the latest value written into the register (or a tag for the value if the value is not yet computed). This tag contains the relative speculative position of a particular instruction in reorder buffer 35. This organization mimics register file 30 which also provides a value in a register when it is presented with a register number. However, reorder buffer 35 and register file 30 use very different mechanisms for accessing values therein.

In the mechanism employed by reorder buffer 35, the reorder buffer compares the requested register number to the register numbers in all of the entries of the reorder buffer. Then, the reorder buffer returns the value (or tag) in the entry that has a matching register number. This is an associative lookup technique. In contrast, when register file 30 is presented with a requested register number, the register file simply decodes the register number and provides the value at the selected entry.

When instruction decoder 25 decodes an instruction, the register numbers of the decoded instruction's source operands are used to access both reorder buffer 35 and register file 30 at the same time. If reorder buffer 35 does not have an entry whose register number matches the requested source register number, then the value in register file 30 is selected as the source operand. However, if reorder buffer 35 does contain a matching entry, then the value in this entry is selected as the source operand because this value must be the most recent value assigned to the register. If the value is not available because the value has not yet been computed, then the tag for the value is instead selected and used as the operand. In any case, the value or tag is copied to the reservation station of the appropriate functional unit. This procedure is carried out for each operand required by each decoded instruction.

In a typical instruction sequence, a given register may be written many times. For this reason, it is possible that different instructions cause the same register to be written into different entries of reorder buffer 35 in the case where the instructions specify the same destination register. To obtain the correct register value in this scenario, reorder buffer 35 prioritizes multiple matching entries by order of allocation, and returns the most recent entry when a particular register value is requested. By this technique, new entries to the reorder buffer supersede older entries.

When a functional unit produces a result, the result is written into reorder buffer 35 and to any reservation station entry containing a tag for this result. When a result value is written into the reservation stations in this manner, it may provide a needed operand which frees up one or more waiting instructions to be issued to the functional unit for execution. After the result value is written into reorder buffer 35, subsequent instructions continue to fetch the result value from the reorder buffer. This fetching continues unless the entry is superseded by a new value and until the value is retired by writing the value to register file 30. Retiring occurs in the order of the original instruction sequence, thus preserving the in-order state for interrupts and exceptions.

With respect to floating point unit 20, it is noted that in addition to the float load functional unit 75 and a float store functional unit 80, floating point unit 20 includes other functional units as well. For instance, floating point unit 20 includes a float add unit 120, a float convert unit 125, a float multiply unit 130 and a float divide unit 140. An OP CODE bus 145 is coupled between decoder 40 and each of the functional units in floating point unit 20 to provide decoded instructions to the functional units. Each functional unit includes a respective reservation station, namely, float add reservation station 120R, float convert reservation station 125R, float multiply reservation station 130R and float divide reservation station 140R. An operand bus 150 couples register file 45 and reorder buffer 50 to the reservation stations of the functional units so that operands are provided thereto. A result bus 155 couples the outputs of all of the functional units of floating point unit 20 to reorder buffer 50. Reorder buffer 50 is then coupled to register file 45. Reorder buffer 50 and register file 45 are thus provided with results in the same manner as discussed above with respect to integer unit 15.

In the particular implementation in the Johnson book, integer reorder buffer 35 holds 16 entries and floating point reorder buffer 50 holds 8 entries. Integer reorder buffer 35 and floating point reorder buffer 50 can each accept two computed results per machine cycle and can retire two results per cycle to the respective register file.

When a microprocessor is constrained to issue decoded instructions in order ("in-order issue"), the microprocessor must stop decoding instructions whenever a decoded instruction generates a resource conflict (ie. two instructions both wanting to use the R1 register) or when the decoded instruction has a dependency, In contrast, microprocessor 10 of FIG. 1 which employs "out-of-order-issue" achieves this type of instruction issue by isolating decoder 25 from the execution units (functional units). This is done by using reorder buffer 35 and the aforementioned reservation stations at the functional units to effectively establish a distributed instruction window. In this manner, the decoder can continue to decode instructions even if the instructions can not be immediately executed. The instruction window acts as a pool of instructions from which the microprocessor can draw as it continues to go forward and execute instructions. A look ahead capability is thus provided to the microprocessor by the instruction window. When dependencies are cleared up and as operands become available, more instructions in the window are executed by the functional units and the decoder continues to fill the window with yet more decoded instructions.

Scalar—Superscalar Comparison

To understand the operation of superscalar microprocessors, it is helpful to compare scalar and superscalar microprocessors at each stage of the pipeline, namely at fetch, decode, execute, writeback and result commit. Table 1 below provides such a comparison.

TABLE 1

| Pipeline Stage | Pipelined Scalar Processor | Pipelined Superscalar Processor (with out-of-order issue & out-of-order completion) |
| --- | --- | --- |
| Fetch | fetch one instruction | fetch multiple instructions |
| Decode | decode instruction | decode instructions |
| | access operands from register file | access operands from register file and reorder buffer |
| | copy operands to functional unit input latches | copy operands to functional unit reservation stations |
| Execute | execute instruction | execute instructions arbitrate for result buses |
| Completion | write result to register file | write results to reorder buffer |
| | forward results to functional unit input latches | forward results to functional unit reservation stations |
| Writeback | n/a | write results to register file |

Branch Prediction and Speculative Execution

The inclusion of a branch prediction unit in the microprocessor can increase its performance. It is well known that branches in the instruction stream of a program hinder the capability of a microprocessor to fetch instructions. This is so because when a branch occurs, the next instruction which the fetcher should fetch depends on the result of the branch. Without a branch prediction unit, the microprocessor's instruction fetcher may become stalled or may fetch incorrect instructions. This reduces the likelihood that the microprocessor can find other instructions in the instruction window to execute in parallel. Hardware branch prediction can be employed by a branch prediction unit to predict the outcomes of branches which occur during instruction fetching. Such a hardware branch prediction unit predicts whether or not branches should be taken. For example, a branch target buffer is employed to keep a running history of the outcomes of prior branches. Based on this history, a decision is made during a particular fetched branch as to which branch the fetched branch instruction will take.

It is noted that software branch prediction also may be employed to predict the outcome of a branch. In that branch prediction approach, several tests are run on each branch in a program to determine statistically which branch outcome is more likely. Software branch prediction techniques typically involve imbedding statistical branch prediction information as to the favored branch outcome in the program itself. It is noted that the term "speculative execution" is often applied to microprocessor design practices wherein a sequence of code (such as a branch) is executed before the microprocessor is sure that it was proper to execute that sequence of code.

One approach to hardware branch prediction is to store a so-called Retire PC (program counter) address in the microprocessor. The Retire PC is a rolling demarcation line between those instructions which are retired from the reorder buffer into the register file as being no longer speculative and those instructions which are still in the reorder buffer as being the results of instructions which were speculatively executed. When instructions are decoded by the instruction decoder and a branch is encountered, the branch prediction unit predicts the target instruction for that branch. The microprocessor then, on speculation, goes about the business of executing the predicted target instruction and the following instructions. The predicted target instruction and the following instructions are designated as "speculatively executed instructions". Until the branch instruction is actually executed, it will not be known if the branch prediction was actually correct and if the speculatively executed instructions were in the proper path. The results of such speculatively executed instructions are temporarily stored in the reorder buffer which acts as a facilitator of speculative execution. In other words, the reorder buffer stores these instruction results as operands on speculation that the predicted executed instructions have been properly selected by the branch prediction unit.

If it turns out that the branch prediction unit has correctly predicted the target of the branch instruction, then the speculatively executed instructions stored in the reorder buffer are retired into the register file. When such retirement occurs, the Retire PC is advanced forward to reflect the address of the instruction immediately after the last of the instructions that have been retired. In other words, when instructions are retired as being no longer speculative, the Retire PC is advanced to the next instruction which is to be speculatively executed. However, if the branch prediction unit was incorrect, a branch mispredict has occurred. In this event, the speculatively executed instruction results in the reorder buffer are discarded and the microprocessor continues execution by taking the correct branch this time.

From the above, it is appreciated that encountering branch instructions can significantly impact the performance of a microprocessor and that branch prediction technology ameliorates this problem to a large degree. However, more performance problems are experienced with branch instructions than just predicting the result of a particular branch. More particularly, branch instructions depend on the state in which various condition codes or flags are set to make a determination of whether a branch is to be taken or not. Thus, in the conventional superscalar microprocessor described above, if the same flag is used by multiple instructions in a sequence, such instruction may have to wait until a prior instruction is done using a particular flag before modifying the state of the flag. This is a flag dependency situation which negatively impacts performance because it slows down issue of instructions to the functional units.

SUMMARY OF THE INVENTION

Accordingly, one advantage of the microprocessor of the present invention is an increase in microprocessor performance with respect to handling branch instructions.

In accordance with one embodiment of the present invention, a superscalar microprocessor is provided including a decoder for decoding instructions contained in an instruction stream and translating decoded instructions into ROPs. The microprocessor includes a reorder buffer, coupled to the decoder, for storing the speculative state of the microprocessor. The microprocessor also includes a register file, coupled to the reorder buffer, for storing the real state of the microprocessor. The reorder buffer of the microprocessor includes a reorder buffer array having a plurality of storage locations which include an integer result portion for storing a speculative integer result and a flag result portion for storing speculative flag information associated with the integer result. The flag result portion and the integer result portion are concatenated to form a floating point storage location which accommodates storage of floating point results that are wider than integer results. A real flags register is coupled to the reorder buffer for storing flag information which is retired from the reorder buffer. One embodiment of the microprocessor includes a floating point unit coupled to the decoder and the reorder buffer, a branch unit coupled to the decoder and the reorder buffer and an integer unit coupled to the decoder and the reorder buffer.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

I. Superscalar Microprocessor—Structural Overview

The following sets forth a detailed description of the best contemplated mode for carrying out the invention. The description is intended to be illustrative of the invention and should not be taken to be limiting.

Figure 1A:
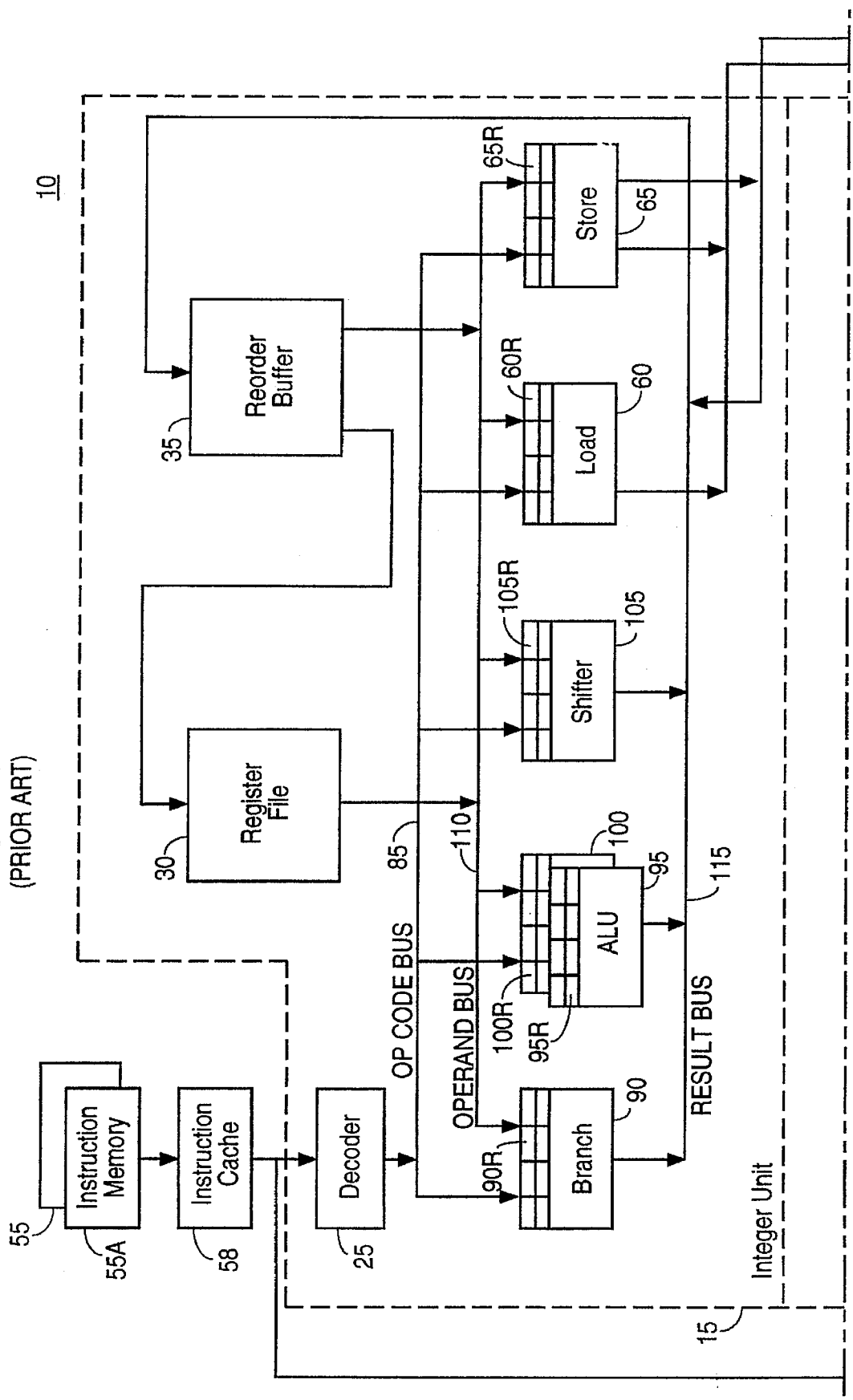
FIG. 1 is a block diagram of a conventional superscalar microprocessor
Figure 1B:
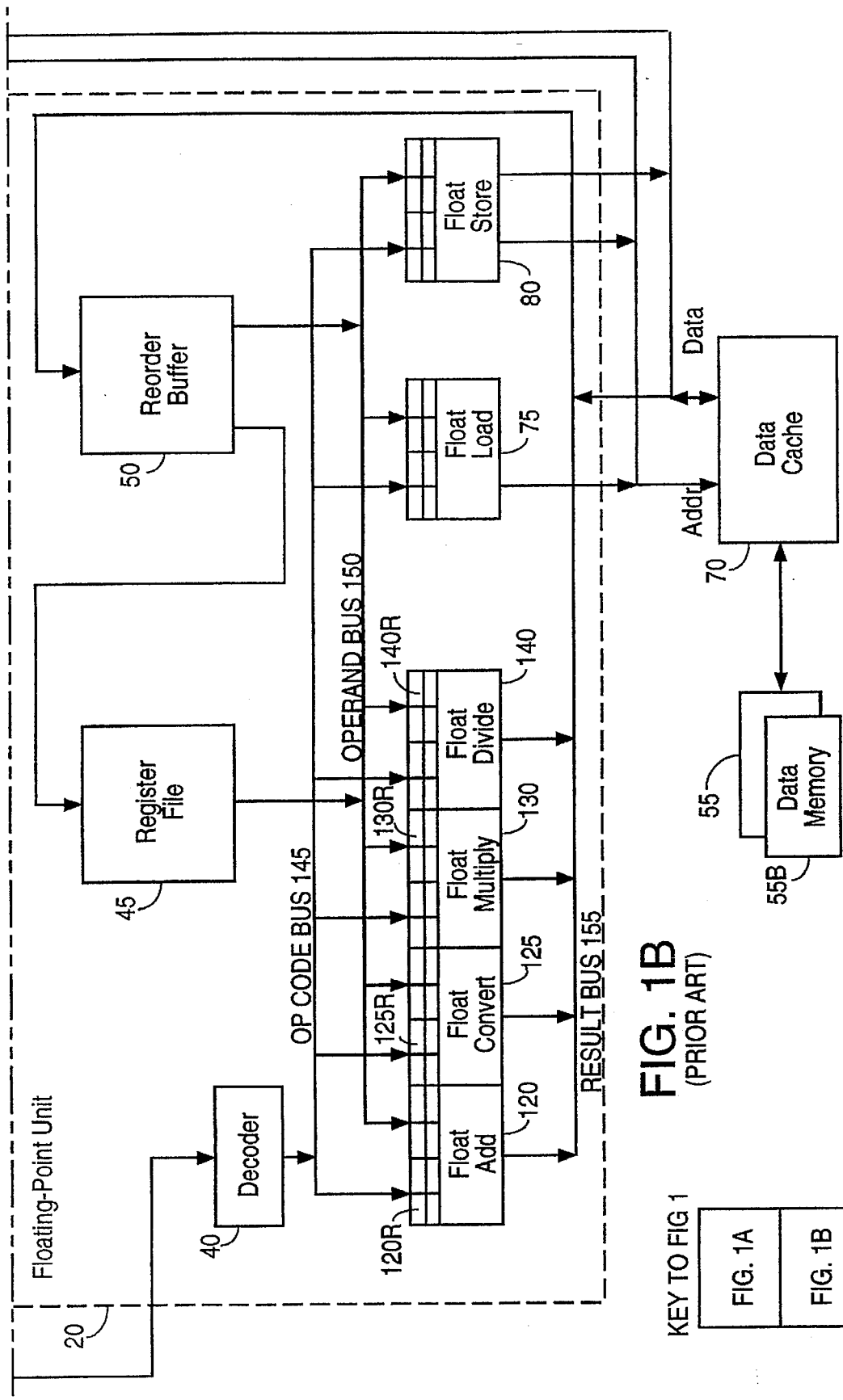
Figure 2A:
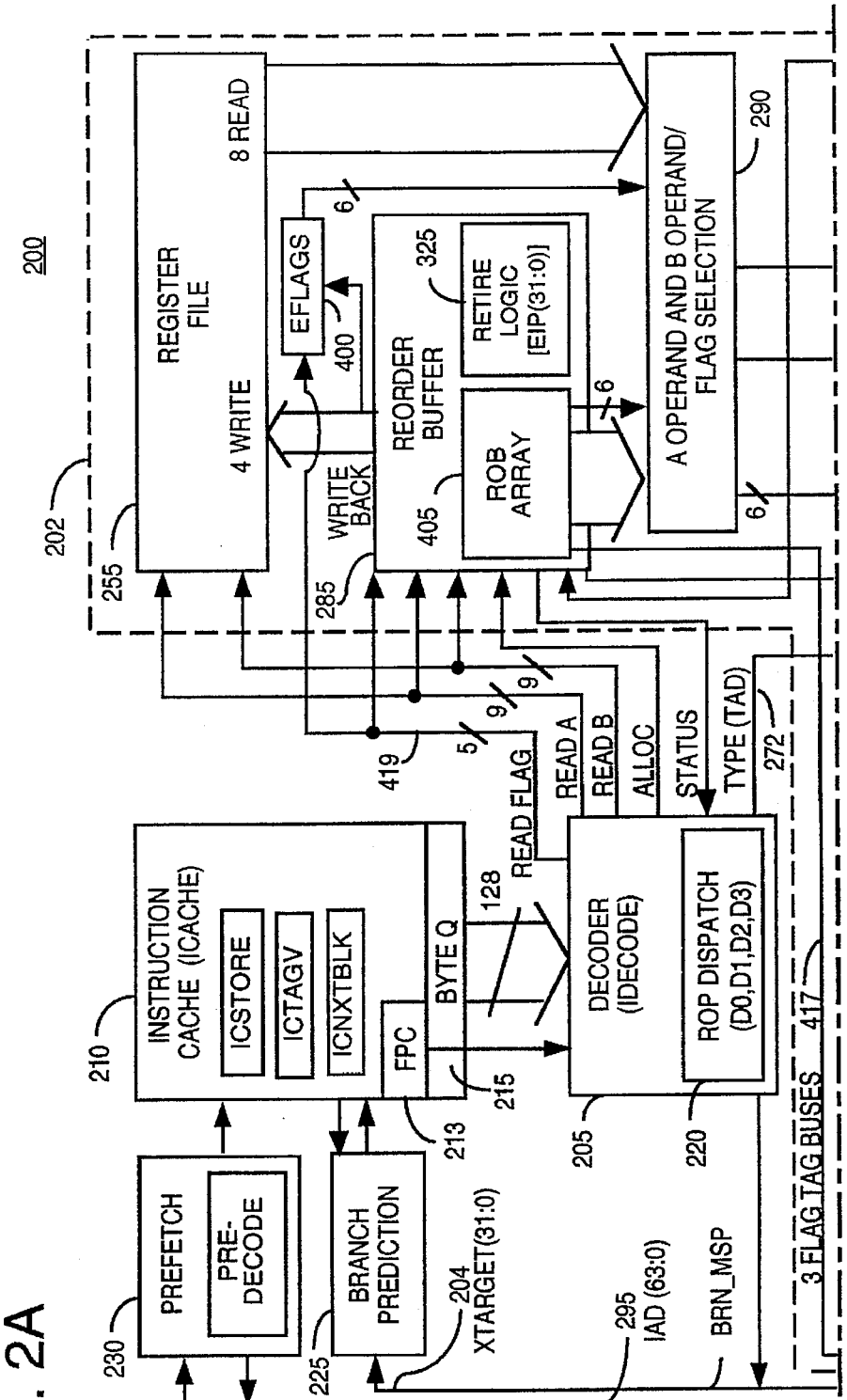
FIG. 2 is a block diagram of a superscalar microprocessor in accordance with the present invention.
Figure 2B:
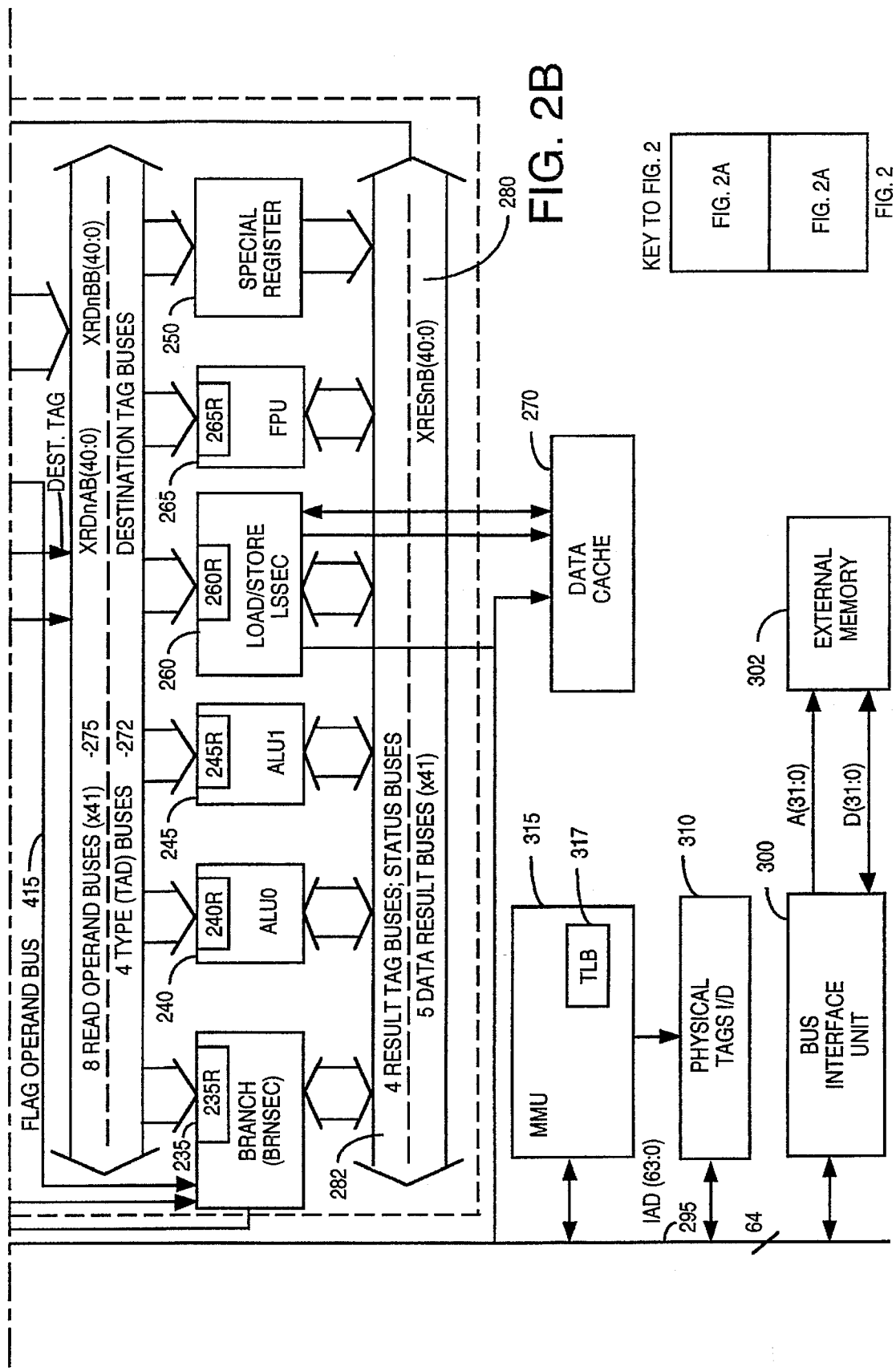

Referring to FIG. 2, the present invention can be best understood in the context of superscalar X86 microprocessor 200 which executes the X86 instruction set. A structural overview of microprocessor 200 is now briefly presented. Microprocessor 200 includes an instruction cache (ICACHE) 210 which is coupled via an internal address and data (IAD) bus 295 to external memory 302 in order to receive instructions and data therefrom. Instruction cache 210 is also coupled to a byte queue (Byte Q) 215 which provides a supply of instructions from instruction cache 210 to instruction decoder 205. Instruction decoder 205 is coupled to RISC core 202. The term "RISC core" refers to the central kernel of microprocessor 200 which is a RISC (Reduced Instruction Set Computer) architecture including register file 255, reorder buffer 285 as well as a variety of functional units such as arithmetic logic and shift unit 240 (ALU0 & SHF), arithmetic logic unit 245 (ALU1), special register block 250 (SRB), load/store functional unit 260 (LSSEC), branch section 235 (BRNSEC), and floating point unit 265 (FPU).

RISC core 202 further includes an operand bus 275 including four A operand buses (XRDnAB(40:0)) and four B operand buses (XRDnBB (40:0)) wherein n is an integer which varies from 0 to 3. RISC core 202 also includes four 12 bit wide type and dispatch (TAD) buses 272 coupled between decoder 205 and the above mentioned functional units as shown in FIG. 2. Each of the four TAD buses 272 correspond to a respective instruction dispatch position D0, D1, D2 and D3 within decoder 205 and conveys the type of a respective instruction to the functional units. More particularly, each TAD bus includes 3 bits dedicated to type information which is provided to the functional units, 1 bit to indicate that a particular dispatch is valid, and 8 bits of opcode.

Microprocessor 200 also includes result tag and result buses 280 XRESnB(40:0) (wherein n varies from 0 to 4) which are coupled to the functional units and reorder buffer 285. The A and B operand buses of operand bus 275 are also coupled to register file 255 and reorder buffer 285. A branch prediction block 225 is provided which predicts branches, namely, whether a branch in a particular cache line is taken or not taken. A branch functional unit or section (BRNSEC) 235 is provided to actually execute branch instructions which are dispatched thereto by decoder 205 in concert with register file 255 and reorder buffer 285. The branch functional unit 235 includes a branch mispredict output that is coupled via a branch mispredict line (BRN_MSP) (which is associated with the XTARGET (31:0) bus) to branch prediction block 225 to inform the branch prediction block as to when a branch mispredict occurs upon actual execution of the branch at branch functional unit 235. The BRN_MSP signal is a control signal by which the branch functional unit 235 indicates that a branch misprediction has occurred. The XTARGET bus transmits a redirection PC which indicates the address at which fetching should now begin. In other words, the XTARGET bus transmits the target address which results when a branch instruction is executed taken.

In addition to instruction cache 210, microprocessor 200 also includes data cache 270 (DCACHE) and physical tag circuit 310. Data cache 270 is coupled to load/store functional unit 260 of the RISC core. Data cache 270 is also coupled via IAD bus 295 to external memory 302 to access data therefrom. Physical tag circuit 310 interacts with both instruction cache 210 and data cache 270 via IAD bus 295. Instruction cache 210 and data cache 270 are both linearly addressable caches. Instruction cache 210 and data cache 270 are physically separate. However, both caches are organized using the same architecture, i.e., both caches include a store array along with a corresponding tag array.

Microprocessor 200 also includes memory management unit (MMU) 315 with a translation lookaside buffer (TLB) 317 and bus interface unit 300 (BIU). Memory management unit 315 is coupled with IAD bus 295 and physical tag circuit 310. Bus interface unit 300 is coupled to physical tag circuit 310 and IAD bus 295 as well as an external microprocessor bus such as the Advanced Micro Devices AM486 bus.

Microprocessor 200 executes computer programs which include sequences of instructions. Computer programs are typically stored on a hard disk, floppy disk or other non-volatile storage media which are located in the computer system. When the program is run, the program is loaded from the storage media into a main memory 302 (external memory) which is accessed by microprocessor 200 via bus interface unit 300. Once the instructions of the program and associated data are in the main memory 302, individual instructions are prepared for execution and ultimately executed by microprocessor 200.

After being stored in main memory 302, the instructions are passed via bus interface unit 300 to instruction cache 210 where the instructions are temporarily held. Instruction decoder 205 receives the instructions from instruction cache 210 via byte queue 215 which aligns and buffers the instructions. Instruction decoder 205 examines the instructions and determines the appropriate action to take. For example, decoder 205 may determine whether a particular instruction is a PUSH, POP, LOAD, AND, OR, EX OR, ADD, SUB, NOP, JUMP, JUMP on condition (BRANCH) or other instruction. Depending on which particular instruction that decoder 205 determines is present, the instruction is dispatched to the appropriate functional unit of RISC core 202.

The instructions which are dispatched to RISC core 202 typically include multiple fields in the following format: OP CODE, OPERAND A, OPERAND B, DESTINATION REGISTER. The OP CODEs are provided from instruction decoder 210 to the functional units of RISC core 202 via type and dispatch (TAD) bus 272. Not only must the OP CODE (or type) of a particular instruction be provided to the appropriate functional unit, but also the designated OPERANDs for the instruction must be retrieved and sent to the functional unit. If the value of a particular operand is stored in external memory 302, then this value is retrieved and stored in data cache 270. This value may then be loaded by load store section 260 and be provided to reorder buffer 285. Alternately, if the value of a particular operand has not yet been calculated, then that value is first calculated and provided to the functional unit before the instruction can be executed. For example, if a current instruction is dependent on a prior instruction, the result of the prior instruction must be determined before the current instruction can be executed. This situation is referred to as a dependency.

The operands which are needed for a particular instruction to be executed by a functional unit are provided to operand bus 275 by either register file 255 or reorder buffer 285. The operand bus conveys the operands to the appropriate functional units. Once a functional unit receives the OP CODE, OPERAND A, and OPERAND B, the functional unit executes the instruction and places the result on result bus 280, which is coupled to the inputs and outputs of all of the functional units and to reorder buffer 285.

Reorder buffer 285 is managed as a first-in first-out (FIFO) device. When an instruction is decoded by instruction decoder 205, a corresponding entry is allocated in reorder buffer 285. The result value computed for the instruction is then written into the allocated entry when the execution of the instruction is completed. The result value is subsequently written into register file 255 and the instruction is retired if there are no exceptions associated with the instruction and if no speculative branch is pending which affects the instruction. If the instruction is not complete when its associated entry reaches the head of the reorder buffer 285, the advancement of reorder buffer 285 is halted until the instruction is completed. Additional entries, however, can continue to be allocated.

Each functional unit includes respective reservation stations (RS) 235R, 240R, 245R, 260R and 265R for storing OP CODEs from instructions which are not yet complete because operands for that instruction are not yet available to the functional unit. Each reservation station stores the instruction's OP CODE and operands together with tags which reserve places for the missing operands that will arrive at the reservation station later. This technique enhances performance by permitting microprocessor 200 to continue executing other instructions while the pending instruction is being assembled with its operands at the reservation station.

Microprocessor 200 provides out-of-order issue by isolating decoder 205 from the functional units of RISC core 202. More specifically, reorder buffer 285 and the reservation stations of the functional units effectively establish a distributed instruction window. Accordingly, decoder 205 can continue to decode instructions even if the instructions can not be immediately executed. The instruction window acts as a pool of instructions from which the functional units draw as they continue to go forward and execute instructions. The instruction window thus provides microprocessor 200 with a look ahead capability. When dependencies are cleared and as operands become available, more instructions in the window are executed by the functional units and the decoder continues to fill the window with yet more decoded instructions.

Microprocessor 200 uses branch prediction unit 225 and branch functional unit 235 (BRNSEC) to enhance performance. Because when a branch occurs, the next instruction depends upon the result of the branch, branches in the instruction stream of a program hinder the capability of the microprocessor to fetch instructions. Accordingly, predicted branches, which are predicted using information which is stored in a successor array of instruction cache 210, are executed by branch section 235. Branch section 235 then examines the results of the branch to determine whether the predicted branch was correct. If there is a branch misprediction, then the contents of reorder buffer 285 allocated subsequent to the mispredicted branch instruction are discarded.

II. Superscalar Microprocessor—Operational Overview

Microprocessor 200 is capable of processing instructions which are variable in size. For example, microprocessor 200 is capable of processing so-called X86 instructions of the familiar Intel™ instruction set which uses variable length instructions.

The architecture of microprocessor 200 is capable of taking so-called CISC (Complex Instruction Set Computer) instructions such as those found in the Intel™ X86 instruction set and converting these instructions to RISC-like instructions (ROP's) which are then processed by RISC core 202. This conversion process takes place in decoder 205 of microprocessor 200 as illustrated in FIG. 2. Decoder 205 decodes CISC instructions, converts the CISC instructions to ROP's, and then dispatches the ROP's to functional units for execution. More detail with respect to the structure and operation of decoder 205 is found in the co-pending patent application entitled "Superscalar Instruction Decoder", Ser. No. 08/146,383 filed Oct. 29, 1993, the disclosure of which is incorporated herein by reference and which is assigned to the assignee of the subject patent application.

The ability of microprocessor 200 to supply the RISC core thereof with a large number of ROPs per clock cycle is one source of the high performance provided by this superscalar microprocessor. Instruction cache (ICACHE) 210 is the component of microprocessor 200 which provides this ROP supply as a queue of bytes or byte queue (byte Q) 215. In this particular embodiment of the invention, instruction cache 210 is a 16K byte effective four-way set associative, linearly addressed instruction cache.

As seen in FIG. 2, the byte Q 215 of instruction cache 210 is supplied to instruction decoder 205. Instruction decoder 205 maps each instruction provided thereto into one or more ROP's. The ROP dispatch window 220 of decoder 205 includes four dispatch positions into which an instruction from ICACHE 210 can be mapped. The four dispatch positions are designated as D0, D1, D2, and D3. In a first example, it is assumed that the instruction provided by byte Q 215 to decoder 205 is an instruction which can be mapped to two ROP dispatch positions. In this event, when this first instruction is provided to decoder 205, decoder 205 maps the instruction into a first ROP which is provided to dispatch position D0 and a second ROP which is provided to dispatch position D1. It is then assumed that a subsequent second instruction is mappable to three ROP positions. When this second instruction is provided by byte Q 215 to decoder 205, the instruction is mapped into a third ROP which is provided to dispatch position D2 and a fourth ROP which is provided to dispatch position D3. The ROP's present at dispatch positions D0 through D3 are then dispatched to the functional units. It is noted that the remaining third ROP onto which the second instruction is mapped must wait for the next dispatch window to be processed before such ROP can be dispatched.

Information with respect to which particular bytes that instruction cache 210 is to drive out into byte Q 215 is contained in branch prediction block 225 which is an input to instruction cache 210. Branch prediction block 225 includes a next block array (ICNXTBLK) indicating on a block by block basis the next predicted branch target location. Branch functional unit 235 is the functional unit which actually executes branch instructions that are encountered in the instruction stream. One branch prediction mechanism which can be used in microprocessor 200 is described in U.S. Pat. No. 5,136,697, W. M. Johnson, entitled "System For Reducing Delay For Execution Subsequent To Correctly Predicted Branch Instruction Using Fetch Information Stored With Each Block Of Instructions In Cache", issued Aug. 4, 1992, the disclosure of which is incorporated herein by reference. Instruction cache 210 is also equipped with a prefetcher block 230 which fetches requested instruction cache misses from external memory 302.

Microprocessor 200 includes four integer functional units to which the four ROP positions of decoder 205 can be issued, namely, branch functional unit 235, ALU0/shifter functional unit 240, ALU1 functional unit 245, and special register functional unit 250. Branch functional unit 235 executes branch instructions and exhibits a one cycle latency. One new ROP can be accepted by branch functional unit 235 per clock cycle. Branch unit 235 includes a two entry reservation station 235R. For purposes of this document, a reservation station including two entries is considered to be synonymous with two reservation stations.

ALU0/shifter functional unit 240 exhibits a one cycle latency. One new ROP can be accepted into unit 240 per clock cycle. ALU0/shifter functional unit 240 includes a two entry reservation station 240R which holds up to two speculative ROP's. All X86 arithmetic and logic calculations go through this functional unit or alternatively the other arithmetic logic unit ALU1, 245. Moreover, shift, rotate or "find first one" instructions are provided to ALU0/shifter function unit 240.

The ALU1 functional unit 245 exhibits a one cycle latency as well. It is noted that one new ROP can be accepted by ALU1 functional unit 245 per clock cycle. The ALU1 functional unit includes a two entry reservation station 245R which holds up to two speculative ROP's. All X86 arithmetic and logic calculations go through this functional unit or the other arithmetic logic unit, ALU0 (240). ALU0 and ALU1 allow up to two integer result operations to be calculated per clock cycle.

The special register functional unit 250 is a special block for handling internal control, status, and mapped state that is outside the general purpose register file 255. In one embodiment of the invention, special register functional unit 250 has no reservation station because no speculative state is pending when an ROP is issued to special register functional unit 250.

A load/store functional unit 260 and a floating point functional unit 265 are coupled to ROP dispatch window 220 of decoder 205. Load/store functional unit 260 includes a four entry reservation station 260R. Floating point functional unit 265 includes two reservation stations 265R. A data cache 270 is coupled to load/store functional unit 260 to provide data storage and retrieval therefor. Floating point functional unit 265 is linked to a 41 bit mixed integer/floating point operand bus 275 and result buses 280. In more detail, operand buses 275 include eight read operand buses exhibiting a 41 bit width. Result buses 280 include 5 result buses, namely 4 general purpose busses exhibiting a 41 bit width and 1 special purpose bus exhibiting a 32 bit width. The special purpose result bus is coupled between load store functional unit 260, branching unit 235 and special register block 250. Load store functional unit returns stores over the special purpose result bus, Branching unit 235 returns branches over the special purpose result bus. Special register block 250 returns its results over the special purpose result bus.

The linkage of floating point unit 265 to the mixed integer/floating point operand and result buses allows one register file 255 and one reorder buffer 285 to be used for both speculative integer and floating point ROP's. Two ROP's form an 82 bit extended precision operation that is input from floating point reservation station 265R into an 82 bit floating point core within floating point functional unit 265.

The 82 bit floating point core of floating point functional unit 265 includes a floating point adder, a floating point multiplier and a floating point divide/square root functional units. The floating point adder functional unit within floating point unit 265 exhibits a two cycle latency. The floating point adder calculates an 80 bit extended result which is then forwarded. The floating point multiplier exhibits a six cycle latency for extended precision multiply operations. A 32×32 multiplier is employed within floating point functional unit 265 for single precision multiplication operations. This 32×32 multiplier is multi-cycled for 64 bit mantissa operations which require extended precision. The floating point divide/square root functional unit employs a radix-4 interactive divide to calculate 2 bits/clock of the 64 bit mantissa.

It is noted that in the present embodiment wherein the bus width of the A/B operand buses is 41 bits, that with respect to those A/B operand buses running to the integer units, 32 bits is dedicated to operands. It should also be noted that other embodiments of the invention are contemplated wherein the bus width of the A/B operand buses is not 41 bits, but rather is 32 bits or other size. In such a 32 bit operand bus width arrangement, control lines separate from the operand bus are employed for transmission of control information.

Load store functional unit 260 includes a four entry reservation station 260R. Load store functional unit 260 permits two load or store operations to be issued per clock cycle. The load store section also calculates the linear address and checks access rights to a requested segment of memory. The latency of a load or store operation relative to checking a hit/miss in data cache 270 is one cycle. Up to two load operations can simultaneously access data cache 270 and forward their operation to result buses 280. Load store section 260 handles both integer and floating point load and store operations.

As seen in FIG. 2, microprocessor 200 includes a register file 255 which is coupled to a reorder buffer 285. Both register file 255 and reorder buffer 285 are coupled via operand/flag selection block 290 to operand buses 275. Register file 255, reorder buffer 285 and operand/flag selection block 290 cooperate to provide operands to the functional units. As results are obtained from the functional units, these results are transmitted to reorder buffer 285 and stored as entries therein.

In more detail, register file 255 and reorder buffer 285 provide storage for operands during program execution. Register file 255 contains the mapped X86 registers for both the integer and floating point instructions. The register file also contains temporary integer and floating point registers and provides for the holding of intermediate calculations. In this particular embodiment of the invention, all of the registers in register file 255 are implemented as eight read and four write latches. The four write ports thus provided allow up to four register file destinations to be written per clock cycle. This can be either one integer value per port or one-half a floating point value per port if a floating point result is being written to the register file. The eight read ports allow four ROPS with two source read operations each to be dispatched per clock cycle.

Reorder buffer 285 is organized as a 16 entry circular FIFO which holds a queue of up to 16 speculative ROP's. Reorder buffer 285 is thus capable of allocating 16 entries, each of which can contain an integer result or one-half of a floating point result. Reorder buffer 285 can allocate four ROP's per clock cycle and can validate up to five ROP's per clock cycle and retire up to four ROP's into register file 255 per clock cycle. The current speculative state of microprocessor 200 is held in reorder buffer 285 for subsequent forwarding to functional units as necessary. Reorder buffer 285 also maintains the relative order of each ROP by virtue of its position in ROB array 405 wherein the entries are stored. Reorder buffer 285 also marks mispredictions and exceptions for handling by an interrupt or trap routine.

Reorder buffer 285 can drive the eight operand buses 275 with eight operands, respectively. Reorder buffer 285 can receive up to five results per clock cycle on the five result buses 280. It is noted that the operand buses are eight 41 bit shared integer/floating point buses. The eight operand buses correspond to the four ROP dispatch positions in ROP dispatch window 220 of decoder 205. Each of the four ROP dispatch positions can have a source A read operand and a source B read operand. Each of the four A and B read operand bus pairs thus formed are dedicated to a fixed ROP and source read location in ROP dispatch window 220.

Register file 255 and reorder buffer 285 are the devices in microprocessor 200 which drive read operand buses 275 with operand information. If no speculative destination exists for a decoded ROP, that is, if an operand requested by the ROP does not exist in the reorder buffer, then the register file supplies the operand. However, if a speculative destination does exist, that is if an operand requested by the decoded ROP does exist in the reorder buffer, then the newest entry in the reorder buffer for that operand is forwarded to a functional unit instead of the corresponding register in the register file. This reorder buffer result value can be a speculative result if it is present in the reorder buffer or a reorder buffer tag for a speculative destination that is still being completed in a functional unit.

The five result buses 280 are 41 bit buses except for the special purpose result bus which is 32 bits wide in this particular embodiment. It is also noted that the read operand and result buses are inputs and outputs, respectively, to all of the integer functional units. These same read operand and result buses are also inputs and outputs, respectively, to the floating point reservation station 265R of the floating point functional unit 265. The floating point reservation station 265R converts the 41 bit operand and result buses to 82 bit extended precision buses that it routes to its constituent dedicated functional units as necessary.

The integer and floating point functional units of microprocessor 200 are provided with local buffering of ROP's via the reservation stations of those units. In most of these functional units, this local buffering takes the form of two entry reservation stations organized as FIFO's. The purpose of such reservation stations is to allow the dispatch logic of decoder 205 to send speculative ROP's to the functional units regardless of whether the source operands of such speculative ROP's are currently available. Thus, in this embodiment of the invention a large number of speculative ROP's can be issued (up to 16) without waiting for a long calculation or a load to complete. In this manner, much more of the instruction level parallelism is exposed and microprocessor 200 is permitted to operate closer to its peak performance.

Each entry of a reservation station can hold two source operands or tags plus information with respect to the destination and opcode associated with each of the entries. The functional units can also forward source operand results which the reorder buffer has marked as being pending (those operands for which the reorder buffer has marked by instead providing an operand tag rather than the operand itself) directly to other functional units which are waiting for such results. In this particular embodiment of the invention, reservation stations at the functional units typically accept one new entry per clock cycle. A functional unit and can forward one new entry per clock cycle to the functional unit.

An exception to this is the load/store section 260 which can accept and complete two entries per clock cycle from its reservation station. Load/store section 260 also has a deeper reservation station FIFO of four entries. All reservation station entries can be deallocated within a clock cycle should an exception occur. If a branch misprediction occurs, intermediate results are allowed to complete in the functional units and are deallocated from the reorder buffer.

Microprocessor 200 includes an internal address/data bus 295 which is coupled to instruction cache 210 via prefetch unit 230 and to bus interface unit 300. Bus interface unit 300 is coupled to a main memory or external memory 302 so that microprocessor 200 is provided with external memory access. IAD bus 295 is also coupled to load/store functional unit 260 as shown in FIG. 2.

In one particular embodiment of the invention, data cache 270, which is coupled to load/store unit 260, is an 8K byte, linearly addressed, four way set associative, dual access cache. Address and data lines couple data cache 270 to load/store functional unit 260 as shown. More specifically, data cache 270 includes two sets of address and data paths between cache 270 and load/store unit 260 to enable two concurrent accesses from load/store functional unit 260. These two accesses can be between 8 and 32 bit load or store accesses aligned to the 16 byte data cache line size. Data cache 270 is organized into 16 byte lines or blocks. In this particular embodiment, data cache 270 is linearly addressed or accessed from the segment based address, but not a page table based physical address. Data cache 270 includes four banks which are organized such that one line in the data cache has 4 bytes in each of the 4 banks. Thus, as long as the linear address of bits [3:2] of the two accesses are not identical, the two accesses can access the data array in cache 270 concurrently.

Data cache 270 is four-way associative in this particular embodiment. It takes the two linear addresses in phase PH1 of the clock and accesses its four banks. The resultant load operations complete in the following clock phase PH2, and can then drive one of the result buses. Requests by functional units for the result busses are arbitrated with requests from the other functional units that desire to write back a result.

Instruction cache 210 and data cache 270 include a respective instruction cache linear tag array and a data cache linear tag array corresponding to the addresses of those instructions and data entries which are stored in these caches. As seen in FIG. 2, microprocessor 200 also includes a physical tags I/D block 310 which is coupled to IAD bus 295 for the purpose of tracking the physical addresses of instructions and data in instruction cache 210 and data cache 270, respectively. More specifically, physical tags I/D block 310 includes physical instruction/data tag arrays which maintain the physical addresses of these cache's. The physical instruction tag array of block 310 mirrors the organization for the corresponding linear instruction tag array of the instruction cache 210. Similarly, the organization of the physical data tag array within block 310 mirrors the organization of the corresponding linear data tag array within instruction cache 210.

The physical I/D tags have valid, shared, and modified bits, depending on whether they are instruction cache or data cache tags. If a data cache physical tag has a modified bit set during a snoop cycle, this indicates that the data element requested is at the equivalent location in the linear data cache. Microprocessor 200 will then start a copyback cycle to external memory and write the requested modified block back to memory where the requesting device can subsequently see it.

A translation lookaside buffer TLB 317 within memory management unit (MMU) 315 is coupled between IAD bus 295 and physical tags I/D block 310 as shown. TLB 317 stores 128 linear to physical page translation addresses and page rights for up to 128 4K byte pages. This translation lookaside buffer array is organized as a four-way set associative structure with random replacement. TLB 315 handles the linear to physical address translation mechanism defined for the X86 architecture. This mechanism uses a cache of the most recent linear to physical address translations to prevent searching external page tables for a valid translation.

Bus interface unit 300 interfaces IAD bus 295 to external apparatus such as memory. IAD bus 295 is a global 64 bit shared address/data/control bus that is used to connect the different components of microprocessor 200. IAD bus 295 is employed for cache block refills, writing out modified blocks, as well as passing data and control information to such functional blocks as the special register unit 250, load/store functional unit 260, data cache 270, instruction cache 210, physical I/D tags block 310 and translation lookaside buffer 315 as well as bus interface unit 300.

III. Superscalar Microprocessor—Detailed Operation

When a CISC program is executed, the instructions and data of the CISC program are loaded into main memory 302 from whatever storage media was employed to store those instructions and data. Once the program is loaded into main memory 302 which is coupled to bus interface unit 300, the instructions are fetched in program order into decoder 205 for dispatch and processing by the functional units. More particularly, up to four instructions are decoded at a time by decoder 205. Instructions flow from main memory 302 to bus interface unit 300, across IAD bus 295, through prefetch unit 230, to instruction cache 210 and then to decoder 205. Instruction cache 210 serves as a depository of instructions which are to be decoded by decoder 205 and then dispatched for execution. Instruction cache 210 operates in conjunction with branch prediction unit 225 to provide decoder 205 with a queue of up to 16 bytes which is the next predicted block of instructions to be speculatively executed.

More particularly, instruction cache 210 includes a store array designated ICSTORE which contains blocks of instructions fetched from main memory via bus interface unit 300. ICACHE 210 is a 16K byte effective linearly addressed instruction cache which is organized into 16 byte lines or blocks. Each cache line or block includes 16 X86 bytes. Each line or block also includes a 5 bit predecode state for each byte. ICACHE 210 is responsible for fetching the next predicted X86 instruction bytes into instruction decoder 205.

ICACHE 210 maintains a speculative program counter designated FETCHPC (FPC) 213. This speculative program counter FETCHPC or FPC is used to access the following three separate random access memory (RAM) arrays that maintain the cache information. In more detail, the three aforementioned RAM arrays which contain the cache information include 1) ICTAGV, an array which maintains the linear tags and the byte valid bits for the corresponding block in the store array ICSTORE. Each entry in the cache includes 16 byte valid bits and a 20 bit linear tag. In this particular embodiment, 256 tags are employed. 2) The array ICNXTBLK maintains branch prediction information for the corresponding block in the store array ICSTORE. The ICNXTBLK array is organized into four sets of 256 entries. Each entry in this next block array is composed of a sequential bit, a last predicted byte, and a successor index. 3) The ICSTORE array contains the X86 instruction bytes plus 5 bits of predecode state. The predecode state is associated with every byte and indicates the number of ROP's to which a particular byte will be mapped. This predecode information is provided by a predecode section of prefetch block 230 and speeds up the decoding of instructions once they are provided to decoder 205. More particularly, the predecode state includes 5 bits of which 2 size bits indicate the number of ROPs to which the instruction maps, 1 start bit indicates the first byte of the instruction, 1 end bit indicates the end of the instruction and 1 opcode bit indicates the opcode byte of the instruction. The byte queue or ICBYTEQ 215 provides the current speculative state of an instruction prefetch stream provided to ICACHE 210 by prefetch unit 230. More information with respect to an instruction cache which may be employed as ICACHE 210 is provided in the copending patent application entitled "Speculative Instruction Queue And Method Therefor Particularly Suitable For Variable Byte-Length Instructions", Ser. No. 08/145,902, filed Oct. 29, 1993, the disclosure of which is incorporated herein by reference and which is assigned to the instant assignee.

Decoder 205 (IDECODE) performs instruction decode and dispatch operations in microprocessor 200. More particularly, decoder 205 performs the two stages of the microprocessor pipeline referred to as Decode 1 and Decode 2. During the beginning of Decode 1, the bytes that are prefetched and predicted executed are driven to the byte queue at a designated fill position. These bytes are then merged with independent bytes in the byte queue 215. In the decode 2 pipeline stage, reorder buffer entries are allocated for corresponding ROP's that may dispatch in the next clock phase.

Decoder 205 takes raw X86 instruction bytes and predecode information from byte queue 215 and allocates them to four ROP positions in ROP dispatch unit 220. Decoder 205 determines which particular functional unit each ROP should be transmitted to. A more detailed discussion of one decoder which may be employed as decoder 205 is found in the U.S. patent application entitled "Superscalar Instruction Decoder" by David B. Witt and Michael D. Goddard, Ser. No. 08/146,383 filed Oct. 29, 1993, the disclosure of which is incorporated herein by reference. The ICACHE and decoder circuitry permits microprocessor 200 to decode and drive four ROP's per clock cycle into a RISC-like data path. The four ROP's are dispatched to the functional units which send results back to reorder buffer 285 and to other functional units which require these results.

Figure 3:
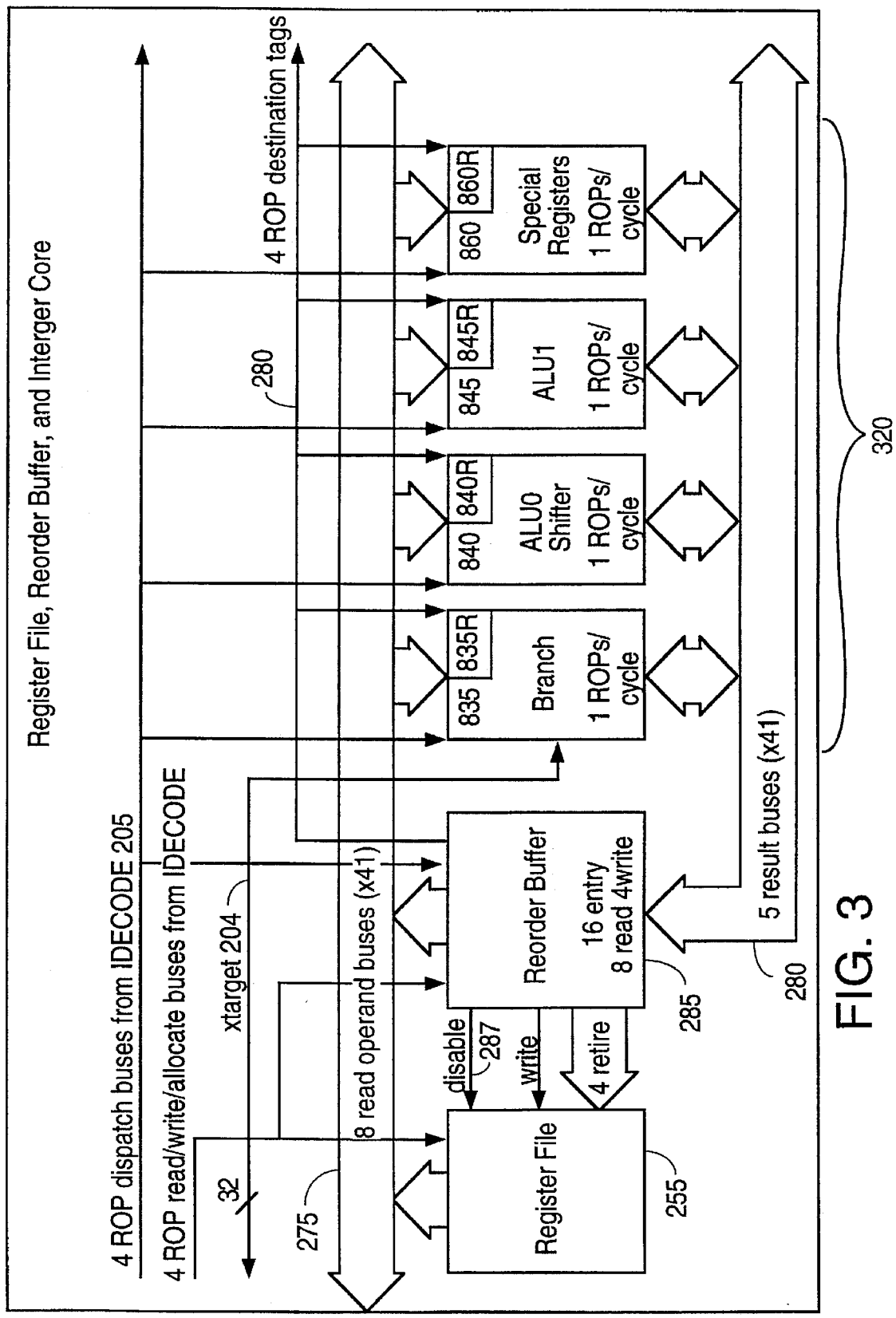
FIG. 3 is a block diagram of the RISC core, reorder buffer and register file of the microprocessor of FIG. 2.

Referring now to FIG. 3, a more detailed discussion of register file 255, reorder buffer 285 and the integer core of microprocessor 200 is now provided. Register file 255 and reorder buffer 285 work together to provide speculative execution to instructions in the program stream. The integer core of microprocessor 200 is designated as integer core 320 and includes the branch functional unit 235, ALU0, ALU1, and special register 260.

In this particular embodiment, register file 255 is organized as 8 32 bit registers (integer registers), 16 41 bit registers (floating point registers), 16 41 bit floating point temporary registers, and 16 41 bit temporary registers which may be used for either integer or floating point operations. These registers are accessed for up to four ROP's in parallel from decoder 205. Read pointers (READ A and READ B) provided by decoder 205 determine which particular register or registers are requested as operand values in a particular ROP as well as the size of the access.

It is noted that register file 255 contains the architectural state of microprocessor 200 whereas reorder buffer 285 contains the speculative state of microprocessor 200. The timing of register file 255 is such that it is accessed in phase PH2 of the decode 2 pipeline stage with up to 8 parallel read pointers. In response to reception of these up to 8 read pointers, register file 255 then drives the operand values thus selected onto the corresponding operand buses in the following PH1 phase of the clock.

A disable bus 287 is shown in FIG. 3 coupling reorder buffer 285 to register file 255. The disable bus is 8×3 or 24 lines wide and includes 8 override signals which indicate to register file 255 that the requested read value has been found as a speculative entry in reorder buffer 285. In this instance, register file 255 is subject to an override and is not permitted to place a requested read operand value on an operand bus. Rather, since a speculative entry is present in reorder buffer 285, reorder buffer 285 will then provide either the actual operand value requested or an operand tag for that value.

Reorder buffer 285 includes 16 entries in this particular embodiment and operates as a queue of speculative ROP result values. As seen in more detail in FIG. 4, reorder buffer 285 includes two pointers which correspond to the head and the tail of the queue, namely the head pointer and the tail pointer. Shifting an allocation of the queue to dispatched ROP's occurs by incrementing these pointers.

The inputs provided to reorder buffer 285 include the number of ROP's that decoder 205 wants to attempt to allocate therein (up to 4 ROP's per block), source operand pointer values (READ A, READ B) for these four ROP's, and the respective destination pointer values. Reorder buffer 285 then attempts to allocate these entries from its current speculative queue. Provided entry space is available for dispatched ROP's, entries are allocated at the tail pointer.

More particularly, when entries are requested from decoder 205, the next entries from the tail of the queue are allocated. The number of a particular entry then becomes the destination tag for that particular ROP from decoder 205. The destination tag is driven at the corresponding ROP position to the functional unit along with the particular instruction to be executed. A dedicated destination tag bus designated "4 ROP destination tags" is shown in FIG. 3 as an output from reorder buffer 285 to the functional units of integer core 320 and the remaining functional units of microprocessor 200. The functional units are thus provided with destination information for each ROP to be executed such that the functional unit effectively knows where the result of an ROP is to be transmitted via the result buses.

From the above, it is seen that speculatively executed result values or operands are temporarily stored in reorder buffer 285 until such result operands are no longer speculative. A pool of potential operand values is thus provided by reorder buffer 285 for use by subsequent ROP's which are provided to and decoded by decoder 205.

Figure 4:
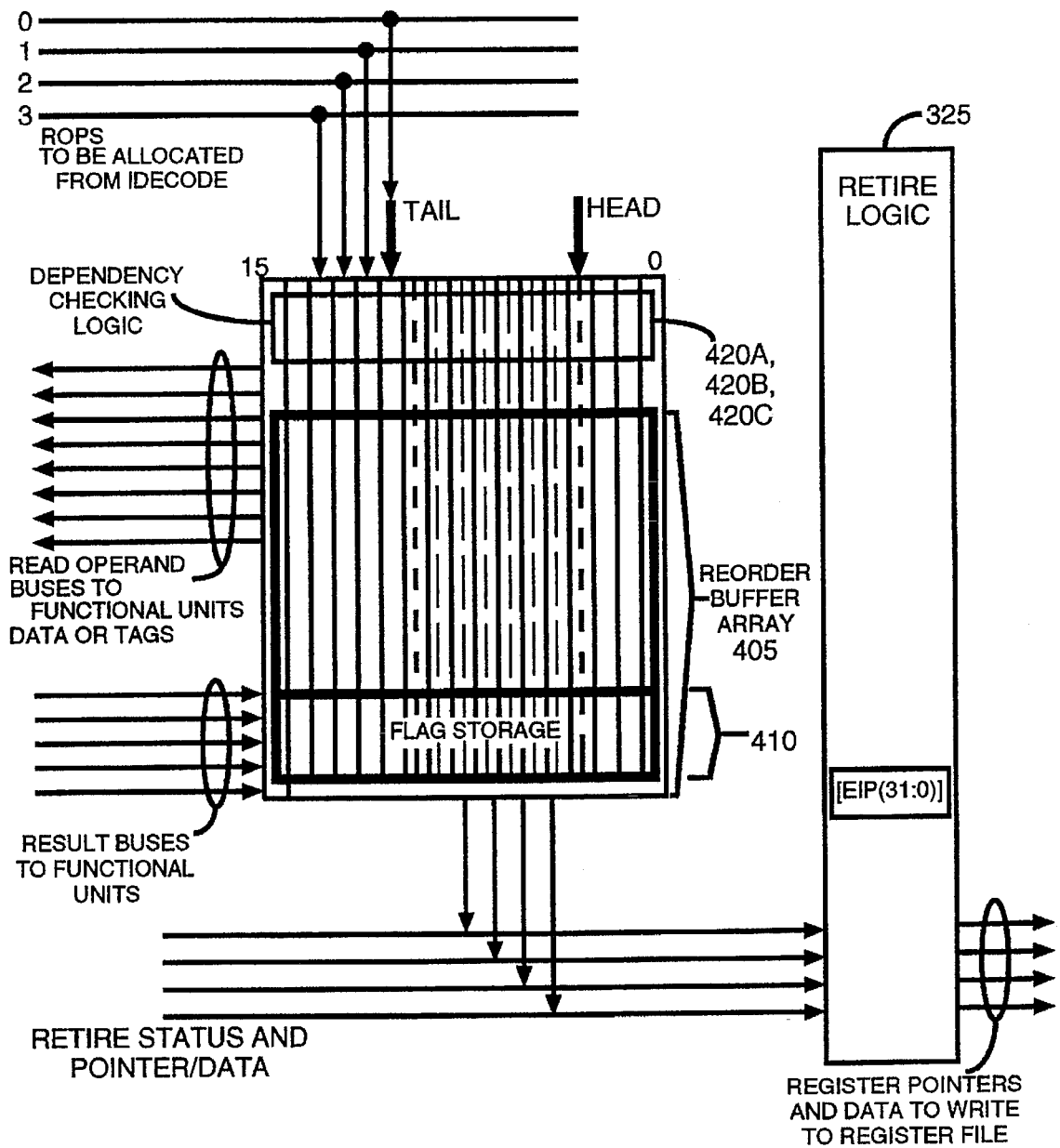
FIG. 4 is a block diagram of the reorder buffer of FIGS. 2 and 3.

When entries exist in reorder buffer 285, the original register number (i.e. EAX) is held in the reorder buffer entry that was allocated for a particular ROP result. FIG. 4 shows the entries that are in a speculative state between the tail and head pointers by dashed vertical lines in those entries. Each reorder buffer entry is referenced back to its original destination register number. When any of the 8 read pointer values from the 4 ROP positions of ROP dispatch unit 220 match the original register number associated with an entry, the result data of that entry is forwarded if valid or the tag is forwarded if the operation associated with that entry is still pending in a functional unit.

Reorder buffer 285 maintains the correct speculative state of new ROP's dispatched by decoder 205 by allocating these ROP's in program order. The 4 ROP's then scan from their present position down to the head position of the reorder buffer queue looking for a match on either of their read operands. If a match occurs in a particular reorder buffer entry, then the corresponding read port in register file 255 is disabled and either the actual result operand or operand tag is presented to the operand bus for reception by the appropriate functional unit. This arrangement permits multiple updates of the same register to be present in the reorder buffer without affecting operation. Result forwarding is thus achieved.

As shown in FIG. 4, reorder buffer 285 includes retire logic 325 which controls the retirement of result operands stored in the reorder buffer queue or array 405. When a result operand stored in queue 405 is no longer speculative, such result operand is transferred under retire logic control to register file 255. To cause this to occur, the retire logic interfacing the retirement of ROP's, the writeback to the register file, and the state of the last 4 ROP entries are scanned. The retire logic 325 determines how many of the allocated ROP entries now have valid results. Moreover, the retire logic scans for taken branches, stores and load misses. If a completed (validated) ROP exists within the last 4 ROP's, then such ROP is retired into the register file. However, if during scanning an ROP entry, a status is found indicating an exception has occurred on a particular ROP, then all succeeding ROP's are invalidated, and a trap vector fetch request is formed with the exception status information stored in the ROP entry.

When a branch mispredict occurs as determined by the branch functional unit 235, reorder buffer entries associated with the mispredicted branch are marked with cancel bits to indicate that such entries are now invalid. Moreover, if one of these cancel bits is encountered while scanning the ROP's in reorder buffer 285, then these ROP entries are invalidated without any writeback or update of the EIP register until the first ROP is encountered that was not marked as being in the mispredicted path.

It is noted that the EIP register contained within retire logic 325 (see FIG. 8) holds the program counter or retire PC which represents the rolling demarcation point in the program under execution which divides those executed instructions which are nonspeculative from those instructions which have been executed upon speculation. The EIP or retire PC is continually updated upon retirement of result operands from reorder buffer 285 to register file 255 to reflect that such retired instructions are no longer speculative. It is noted that reorder buffer 285 readily tracks the speculative state and is capable of retiring multiple X86 instructions or ROP's per clock cycle. Microprocessor 200 can quickly invalidate and begin fetching a corrected instruction stream upon encountering an exception condition or branch misprediction.

In the case of a mispredicted branch, ROP results resulting from the mispredicted branch are marked with cancel bits in the reorder buffer 285. When retire logic 325 encounters ROP results in reorder buffer 285 with the cancel bits set, the retire logic does not update such ROP results and retire them into register file 255, but rather such results are deallocated and made available for new ROPs.

Figure 9:
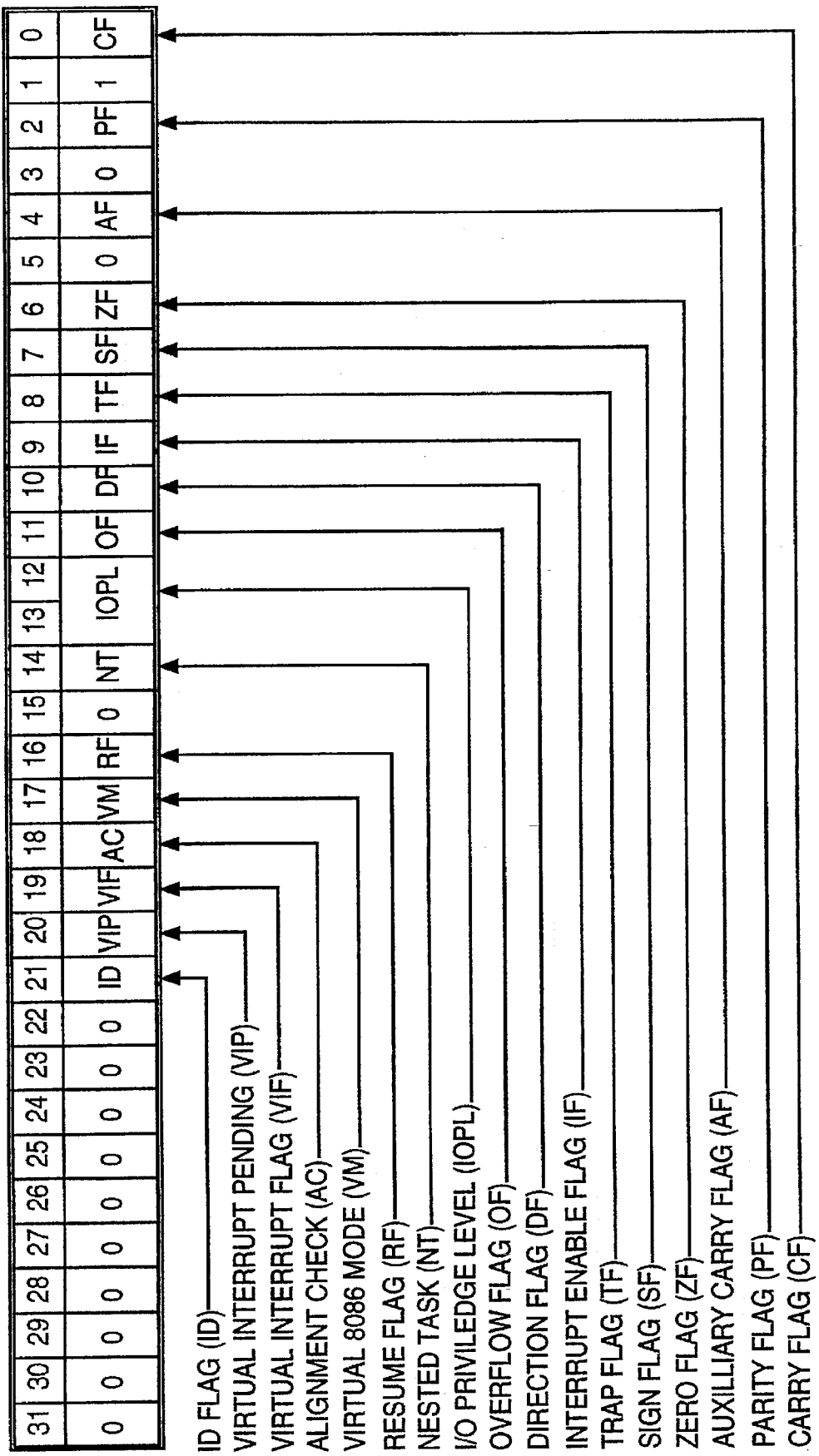
FIG. 9 is a representation of the flag register of the microprocessor of the invention

The general organization of the functional units of microprocessor 200 is now described with reference to a generalized functional unit block diagram shown for purposes of example in FIG. 5. It should be recalled that ROP's containing an opcode, an A operand, a B operand, and a destination tag are being dispatched to the generalized functional unit of FIG. 5. In the leftmost portion of FIG. 5, it is seen that four A operand buses are provided to a (1:4) A operand multiplexer 332 which selects the particular A operand from the instructions dispatched thereto. In a similar manner, the four B operand buses are coupled to a (1:4) B operand multiplexer 335 which selects the particular B operand for the subject instruction which the functional unit of FIG. 9 is to execute. Four destination/opcode buses are coupled to a multiplexer 340 which selects the opcode and destination tag for the particular instruction being executed by this functional unit.

This functional unit monitors the type bus at the "find first FUNC type" input to multiplexer 340. More particularly, the functional unit looks for the first ROP that matches the type of the functional unit, and then enables the 1:4 multiplexers 332, 335, and 340 to drive the corresponding operands and tag information into reservation station 1 of the functional unit of FIG. 5. For example, assuming that execution unit 545 is Arithmetic Logic Unit 1 (ALU1) and that the instruction type being presented to the functional unit at the TYPE input of multiplexer 340 is an ADD instruction, then the destination tag, opcode, A operand and B operand of the dispatched instruction is driven into reservation station 1 via the selecting multiplexers 332, 335, and 340.

A second reservation station, namely reservation station 0 is seen between reservation station 1 and execution unit 345. The functional unit of FIG. 5 is thus said to include two reservation stations, or alternatively, a reservation station capable of holding two entries. This two entry reservation station is implemented as a FIFO with the oldest entry being shown as reservation 0. The reservation stations 0 and 1 can hold either operands or operand tags depending upon what was sent to the functional unit on the operand buses from either register file 255 or reorder buffer 285.

To achieve result forwarding of results from other functional units which provide their results on the four general purpose result buses, the functional unit includes A forwarding logic 350 and B forwarding logic 355. It is noted that of the five result buses, result forwarding is provided on the four general purpose result buses. A forwarding logic 350 scans the four general purpose result buses for tags to match either the source A operand and when a match occurs, A forwarding logic 350 routes the corresponding result bus to the A data portion 360 of reservation station 1. It should be noted here that when an A operand tag is provided via multiplexer 330 instead of the actual A operand, then the A operand tag is stored at the location designated A tag 365. It is this A operand tag stored in A tag position 365 which is compared with the scanned result tags on the four general purpose result buses for a match. In a similar manner, B forward logic 355 scans the four general purpose result buses for any result tags which match the B operand tag stored in B operand tag position 370. Should a match be found, the corresponding result operand is retrieved from the result buses and stored in B data location 375. The destination tag and opcode of the ROP being executed by the functional unit are stored in tag and opcode location 380.

When all information necessary to execute an ROP instruction has been assembled in the functional unit, the ROP instruction is then issued to execution unit 345 for execution. More particularly, the A operand and the B operand are provided to execution unit 345 by the reservation station. The opcode and destination tag for that instruction are provided to execution unit 345 by the tag and opcode location 380. The execution unit executes the instruction and generates a result. The execution unit then arbitrates for access to the result bus by sending a result request signal to an arbitrator (not shown). When the execution unit 345 is granted access to the result bus, a result grant signal is received by execution unit 345 from the arbitrator. Execution unit 345 then places the result on the designated result bus.

The result is forwarded to other functional units with pending operands having the same tag as this result. The result is also provided to reorder buffer 285 for storage therein at the entry associated with the destination tag of the executed ROP.

In actual practice, the functional unit arbitrates for the result bus while the instruction is executing. More particularly, when a valid entry is present in the functional unit, namely when all operand, opcode and destination tag information necessary for execution have been assembled, the instruction is issued to execution unit 345 and the functional unit arbitrates for the result bus while execution unit 345 is actually executing the instruction. It is noted that each reservation station contains storage for the local opcode as well as the destination tag. This tag indicates the location to which the ROP will eventually write back during the completion pipeline stage.

Figure 5A:
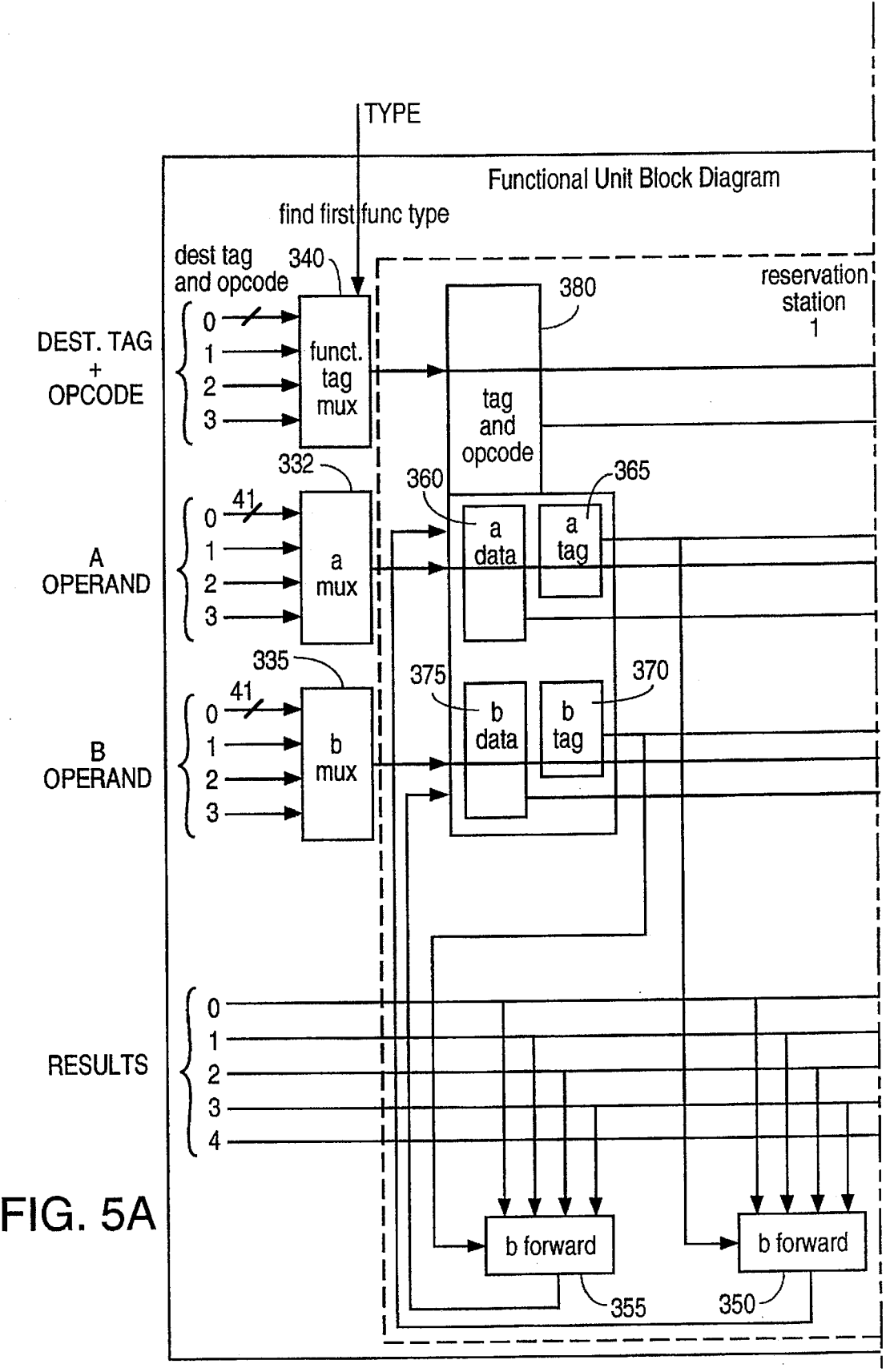
FIG. 5 is a block diagram of a functional unit employed by the microprocessor of the invention.
Figures 5, 5B:
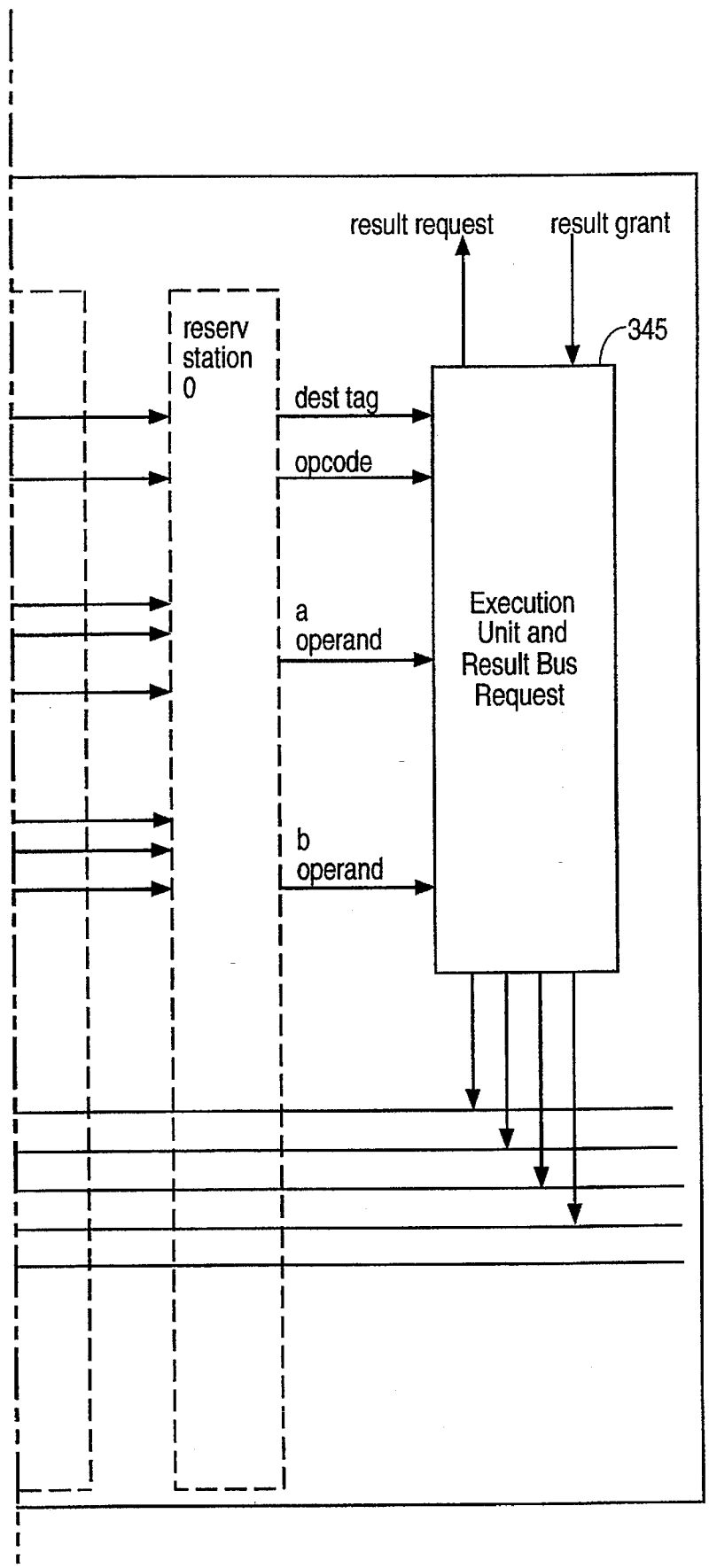

While a generalized functional unit block diagram has been discussed with respect to FIG. 5, execution unit 345 may be any of branch functional unit 235, ALU0/Shifter 240, ALU1 245, load/store 260, floating point unit 265 and special register 250 with appropriate modification for those particular functions.

Upon a successful grant of the result bus to the particular functional unit, the result value is driven out on to the result bus and the corresponding entry in the reservation station is cleared. The result buses include a 41 bit result, a destination tag and also status indication information such as normal, valid and exception. In the pipelined operation of microprocessor 200, the timing of the functional unit activities just described occurs during the execute stage. During clock phase Ph1, the operands, destination tags and opcodes are driven as the ROP is dispatched and placed in a reservation station. During the Ph2 clock phase, the operation described by the OP code is executed if all operands are ready, and during execution the functional unit arbitrates for the result buses to drive the value back to the reorder buffer.

Figure 6:
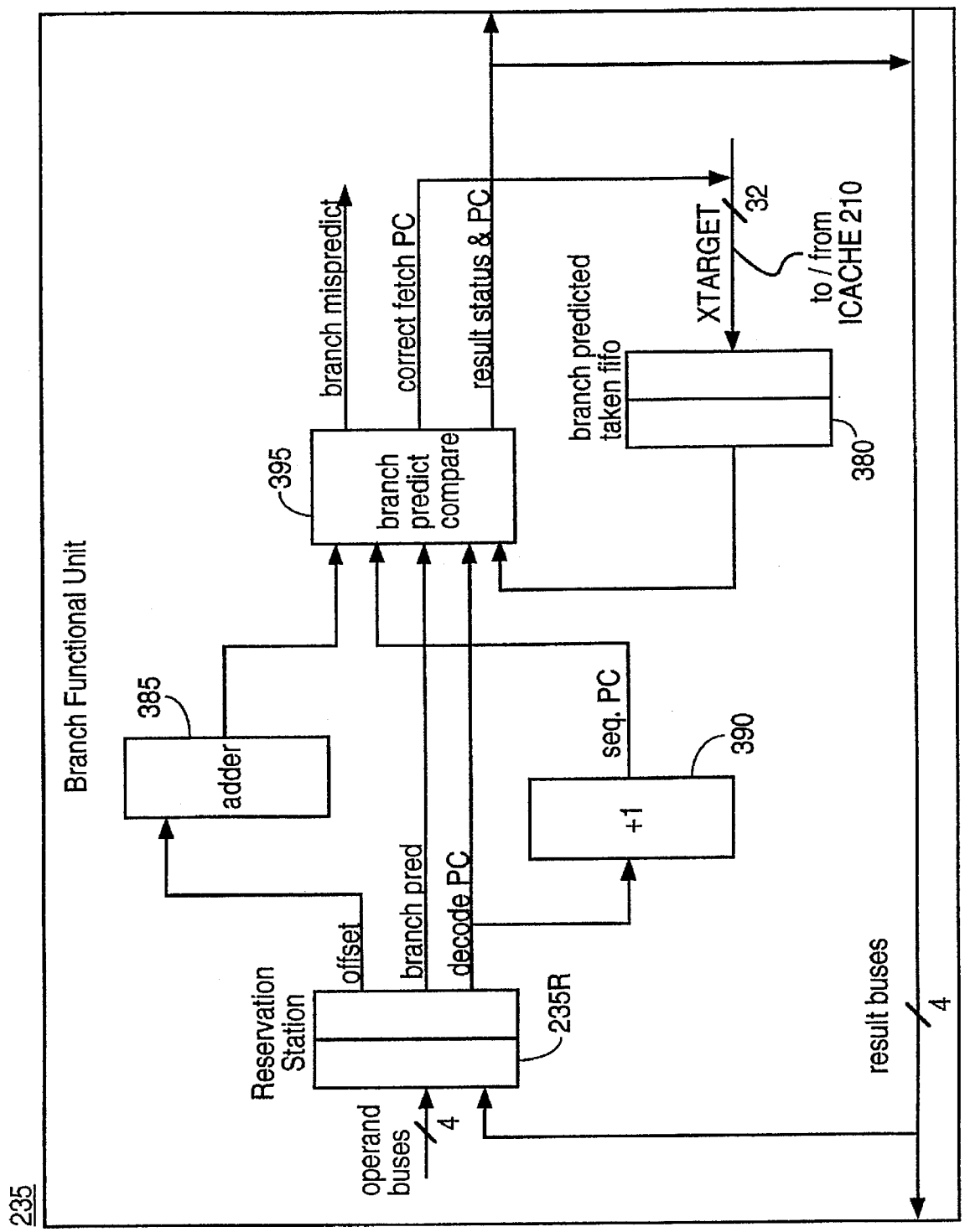
FIG. 6 is a block diagram of a branching unit employed by the microprocessor of the invention.

FIG. 6 is a more detailed representation of branch functional unit 235 which handles branch ROPs. Branch unit 235 includes reservation station 235R, and a branch FIFO 380 for tracking predicted taken branches. Branch functional unit 235 also includes an adder 385, an incrementer 390, and a branch predict comparator 395 all for handling PC relative branches.

Branch functional unit 235 controls speculative branches by using the branch predicted taken FIFO 380 shown in FIG. 6. More specifically, every nonsequential fetch predicted by the instruction cache 210 in conjunction with branch prediction block 225 is driven to branch predicted FIFO 380 and latched therein along with the PC (program counter) of that branch. Branch FIFO 380 contains the predicted target address for a pending branch. This information is driven onto the target bus (XTARGET) and decode PC buses to the branch functional unit. When the corresponding branch is later decoded and issued, the actual outcome and the target address are calculated locally by branch functional unit 235. If a match occurs, the result is sent back correctly to reorder buffer 285 with the target PC and a status indicating a match. If a branch misprediction has occurred, the correct target is driven to both instruction cache 210 to begin fetching as well as reorder buffer 285 to cancel the succeeding ROPs contained in the missed predicted branch. In this manner, execution can be restarted at the correct target PC and corruption of the execution process is thus prevented. Whenever a misprediction does occur, branch functional unit 235 sends both the new target address as well as the index to the block where the prediction information was to update this array. This means that the microprocessor begins fetching the new correct stream of instructions while simultaneously updating the prediction array information. It is noted that the microprocessor also accesses the prediction information with the new block to know which bytes are predicted executed. The ICNXTBLK array (shown in FIG. 2 in ICACHE 210) is dual ported so that the prediction information can be updated though a second port thereof. The prediction information from the block where the misprediction occurs is information such as sequential/non-sequential, branch position, and location of the first byte predicted executed within the cache array.

Adder 385 and incrementer 390 calculate locally the current PC+offset of the current branch instruction, as well as the PC+instruction length for the next PC if sequential. These values are compared by comparator 395 against the predicted taken branches in a local branch taken queue (FIFO 380) for predicting such branches.

The major internal buses of microprocessor 200 are now summarized as a prelude to discussing timing diagrams which depict the operation of microprocessor 200 throughout its pipeline stages. It is noted that a leading X on a bus line indicates a false bus that is dynamically precharged in one phase and conditionally asserted in the other phase. The microprocessor 200 internal buses include:

FPC (31:0)—Ph1, static. This fetch PC bus is used for speculative instruction prefetches from the instruction cache 210 into byte queue 215. The FPC bus is coupled to FPC block 213 within ICACHE 210.

XTARGET (31:0)—Ph1 dynamic. This bus communicates the target PC for redirection of mispredicted branches and exceptions to the instruction cache 210 and branch prediction units (225/235).

XICBYTEnB (12:0) Ph1, dynamic. This bus is the output of the instruction cache store array ICSTORE of the currently requested prefetched X86 instruction plus corresponding predecode information. In this particular embodiment, a total of 16 bytes can be asserted per clock cycle aligned such that the next predicted executed byte fills the first open byte position in the byte queue.

BYTEQn (7:0) Ph1, static. This represents the queue of predicted executed X86 instruction bytes that have been prefetched from the instruction cache. In this particular embodiment, a total of 16 bytes are presented to the decode paths of decoder 205. Each byte contains predecode information from the instruction cache with respect to the location of instruction start and end positions, prefix bytes, and opcode location. The ROP size of each X86 instruction is also included in the predecode information. The predecode information added to each byte represents a total of 6 bits of storage per byte in the byte queue, namely 1 valid bit plus 5 predecode bits.

IAD (63.0)—Ph1 dynamic. IAD bus 295 is the general interconnect bus for major microprocessor 200 blocks. It is used for address, data, and control transfer between such blocks as well as to and from external memory all as illustrated in the block diagram of FIG. 2.

XRDnAB (40:0) Ph1, dynamic. This designation represents the source operand A bus for each ROP provided to the functional units and is included in operand buses 275. More specifically, it includes a total of four 41 bit buses for ROP 0 through ROP 3. A corresponding tag bus included in the operand buses indicates when a forwarded tag from reorder buffer 285 is present instead of actual operand data from reorder buffer 285.

XRDnBB (40:0)—Ph1, dynamic. This designation indicates the source operand B bus for each ROP sent to the functional units. This bus structure includes four 41 bit buses for ROP 0 through ROP 3 and is included in the eight read operand buses 275. It is again noted that a corresponding tag bus indicates when a forwarded operand tag is present on this bus instead of actual operand data from reorder buffer 285.

XRESnB (40:0)—Ph1, dynamic. This designation indicates result bus 280 for 8, 16, 32 bit integers, or ½ an 80 bit extended result. It is noted that corresponding result tag and status buses 282 validate an entry on this result bus.

Figure 7:
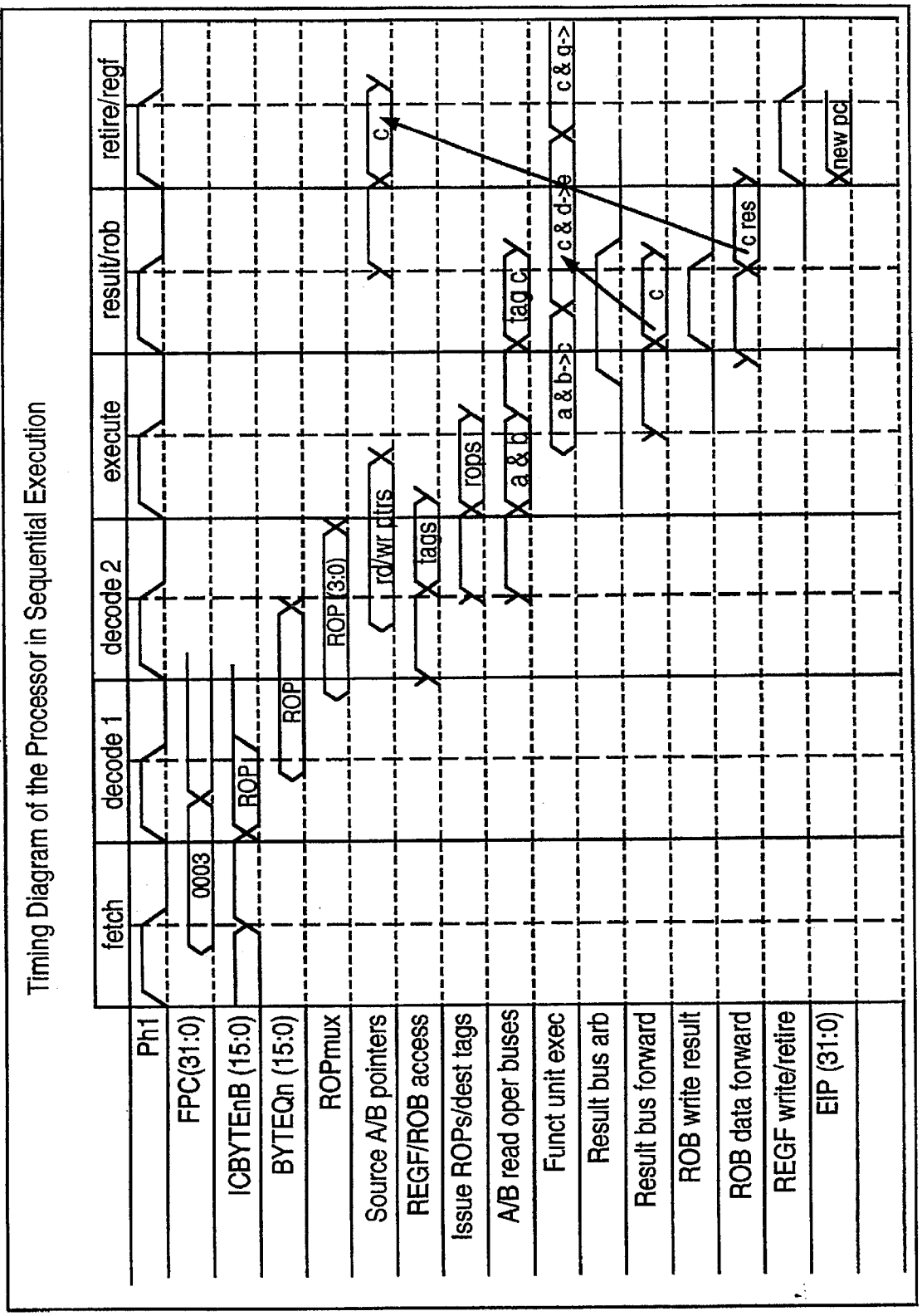
FIG. 7 is a timing diagram illustrating the operation of the microprocessor of the invention during sequential execution.

Microprocessor 200 includes a six stage pipeline including the stages of fetch, decode1, decode2, execute, result/ROB and retire/register file. For clarity, the decode stage has been divided into decode1 and decode2 in FIG. 7. FIG. 7 shows the microprocessor pipeline when sequential execution is being conducted. The successive pipeline stages are represented by vertical columns in FIG. 7. Selected signals in microprocessor 200 are presented in horizontal rows as they appear in the various stages of the pipeline.

The sequential execution pipeline diagram of FIG. 7 portrays the following selected signals:

"Ph1" which represents the leading edge of the system clocking signal. The system clocking signal includes both Ph1 and Ph2 components.

"FPC(31:0)" which denotes the fetch PC bus from byte queue 215.

"ICBYTEnB (15:0)" which is the ICBYTE bus from the ICSTORE array of instruction cache 210 which is coupled to byte queue 215.

"BYTEQn (15:0)" which is the byte queue bus.

"ROPmux" is a block within decoder 205 which converts X86 instruction bytes from the byte Q into ROPs. This block operates at the time indicated as ROPmux in FIGS. 7 and 8. The ROPmux block (not shown) is responsible for mapping 16 bytes of the X86 instruction byte Q to four ROPs in specific dispatch positions.

"Source A/B pointers" which are read/write pointers (READ A, READ B) for the A and B operands provided by decoder 205 to reorder buffer 285 and to register file 255. The source pointers are the values that are inputs into both the register file and the reorder buffer from the decode block.

"REGF/ROB access" indicates access to the register file and reorder buffer for the purpose of obtaining operand values for transmission to functional units.

"Issue ROPs/dest tags" indicates the issuance of ROPs and destination tags by decoder 205 to the functional units.

"A/B read oper buses" indicates the reading of the A and B operand buses by the functional units to obtain A and B operands or tags therefore.

"Funct unit exec" indicates execution by the functional units. It is noted that in FIGS. 7 and 8, the designations a&b→c and c&d→e and c&g→ indicate arbitrary operations and are in the form "source 1 operand, source 2 operand→destination". More specifically, the designated source registers are registers, namely temporary or mapped X86 registers. In the a&b→c example, the "c" value represents the destination and shows local forwarding from both the result buses as well as the reorder buffer to subsequent references in the predicted executed stream.

"Result Bus arb" indicates the time during which a functional unit is arbitrating for access to result bus 280 for the purpose of transmission of the result to the reorder buffer and any other functional units which may need that result since that unit holds an operand tag corresponding to such result.

"Result bus forward" indicates the time during which results are forwarded from a functional unit to other functional units needing that result as a pending operand.

"ROB write result" indicates the time during which the result from a functional unit is written to the reorder buffer.

"ROB data forward" indicates the time during which the reorder buffer forwards operand data to functional units in place of operands for which it presently does not yet have results.

"REGF write/retire" indicates the time during which a result is retired from the FIFO queue of the reorder buffer to the register file.

"EIP (31:0)" indicates the retire PC value. The retire PC value or EIP is contained in the retire logic 325 of reorder buffer 285.

The timing diagram of FIG. 7 shows microprocessor 200 executing a sequential stream of X86 bytes. In this example, the predicted execution path is actually taken as well as being available directly from the instruction cache.

The first stage of instruction processing is the instruction fetch. As shown, this clock cycle is spent conducting instruction cache activities. Instruction cache 210 forms a new fetch PC (FPC) during Ph1 of the clock cycle and then accesses the cache arrays of the instruction cache in the second phase of that clock cycle. The fetch PC program counter (shown in the timing diagram as FPC (31:0)) accesses the linear instruction cache's tag arrays in parallel with the store arrays. Late in clock phase Ph2 of the fetch, a determination is made whether the linear tags match the fetch PC linear address. If a match occurs, the predicted executed bytes are forwarded to the byte queue 215.

In addition to accessing the tag and store arrays in instruction cache, the fetch PC also accesses the block prediction array, ICNXTBLK. This block prediction array identifies which of the X86 bytes are predicted executed and whether the next block predicted executed is sequential or nonsequential. This information, also accessed in Ph2, determines which of the bytes of the currently fetched block will be driven as valid bytes into byte queue 215.

Byte queue 215 may currently have X86 bytes stored therein that have been previously fetched and not yet dispatched to functional units. If this is the case, a byte filling position is indicated to instruction cache 210 to shift the first predicted byte over by this amount to fill behind the older X86 bytes.

It is noted that since the branch prediction information occurs in clock phase Ph2 of the fetch, the next block to be prefetched by prefetch unit 230 can be sequential or nonsequential since in either case there is one clock cycle in which to access the cache arrays again. Thus, the branch prediction arrays allow a branch out of the block to have the same relative performance as accessing the next sequential block thus providing performance enhancement.

The Decode1/Decode2 pipeline stages are now discussed. During the beginning of decode1, the bytes that were prefetched and predicted executed are driven into byte queue 215 at the designated fill position. This is shown in the timing diagram of FIG. 7 as ICBYTEnB (12:0) asserting in Ph1 of decode1. These bytes are then merged with any pending bytes in the byte queue. The byte queue contains the five bits of predecode state plus the raw X86 bytes to show where instruction boundaries are located. The head of the byte queue is at the beginning of the next predicted executed X86 instruction. In the middle of clock phase Ph1 of decode1, the next stream of bytes from the instruction cache is merged with the existing bytes in byte queue 215 and the merged stream is presented to decoder 205 for scanning. Decoder 205 determines the number of ROPs each instruction takes and the position of the opcode to enable alignment of these opcodes to the corresponding ROP issue dispatch positions D0, D1, D2, and D3 with the ROP at D0 being the next ROP to dispatch. Decoder 205 maintains a copy of the program counters PC's of each of the X86 instructions in byte queue 215 by counting the number of bytes between instruction boundaries, or detecting a branch within the instruction cache and attaching the target PC value to the first X86 byte fetched from that location.

Utilizing the OP code and ROP positioning information, as well as the immediate fields stored in byte queue 215, decoder 205 statically determines the following information during clock phase Ph2 of decode1 and clock phase Ph1 of decode2: 1) functional unit destination, 2) source A/B and destination operand pointer value, 3) size of source and destination operations, and 4) immediate address and data values if any. By the end of clock phase Ph1 of decode2 all the register read and write pointers are resolved and the operation is determined. This is indicated in the timing diagram of FIG. 7 by the assertion of the source A/B pointer values.

In the decode2 pipeline stage depicted in the timing diagram of FIG. 7, the reorder buffer entries are allocated for corresponding ROPs that may issue in the next clock phase. Thus, up to four additional ROPs are allocated entries in the 16 entry reorder buffer 285 during the Ph1 clock phase of decode 2. During the Ph2 clock phase of decode2, the source read pointers for all allocated ROPs are then read from the register file while simultaneously accessing the queue of speculative ROPs contained in the reorder buffer. This simultaneous access of both the register file and reorder buffer arrays permits microprocessor 200 to late select whether to use the actual register file value or to forward either the operand or operand tag from the reorder buffer. By first allocating the four ROP entries in the reorder buffer in Ph1 and then scanning the reorder buffer in Ph2, microprocessor 200 can simultaneously look for read dependencies with the current ROPs being dispatched as well as all previous ROPs that are still in the speculative state. This is indicated in the timing diagram of FIG. 7 by the REGF/ROB access and the check on the tags.

In the execute pipeline stage, ROPs are issued to the functional units by dedicated OP code buses as well as the read operand buses. The dedicated OP code buses communicate the OP code of an ROP to a functional unit whereas the read operand buses transmit operands or operand tags to such functional units. The time during which the operand buses communicate operands to the functional units is indicated in the timing diagram of FIG. 7 by the designation A/B read operand buses.

In the latter part of the Ph1 clock phase of the execute pipeline stage, the functional units determine which ROPs have been dispatched to such functional units and whether any pending ROPs are ready to issue from the local reservation stations in such functional units. It is noted that a FIFO is maintained in a functional unit's reservation station to ensure that the oldest instructions contained in the reservation stations execute first.

In the event that an ROP is ready to execute within a functional unit, it commences such execution in the late Ph1 of the execute pipeline stage and continues statically through Ph2 of that stage. At the end of Ph2, the functional unit inspects the result of arbitration to determine if it was granted a result bus as indicated by a result grant signal (not shown). In other words, the result bus arbitration signal is asserted during this time. If a functional unit is granted access to the result bus, then it drives the allocated result bus in the following Ph1.

The result pipeline stage shown in the timing diagram of FIG. 7 portrays the forwarding of a result from one functional unit to another which is in need of such result. In clock phase Ph1 of the result pipeline stage, the location of the speculative ROP is written in the reorder buffer with the destination result as well as any status. This entry in the reorder buffer is then given an indication of being valid as well as allocated. Once an allocated entry is validated in this matter, the reorder buffer is capable of directly forwarding operand data as opposed to an operand tag upon receipt of a requested read access. In clock phase Ph2 of the result pipeline stage, the newly allocated operand data can be detected by subsequent ROPs that require it to be one of its source operands. This is shown in the timing diagram of FIG. 7 as the direct forwarding of result C via "ROB data forward" onto the source A/B operand buses.

The retire pipeline stage is the last stage of the pipeline in the timing diagram of FIG. 7. This stage is where the real program counter (retire PC) in the form of the EIP register is maintained and updated as indicated by the bus designation EIP (31:0). As seen in FIG. 7, the EIP (31:0) timing diagram shows where a new PC (or retire PC) is generated upon retirement of an instruction from the reorder buffer to the register file. The actual act of retirement of a result from the reorder buffer to the register file is indicated by the signal designated REGF write/retire in FIG. 7. It is seen in FIG. 7 that in the clock phase Ph1 of the retire pipeline stage, the result of an operation is written to the register file and the EIP register is updated to reflect that this instruction is now executed. The corresponding entry in the reorder buffer is deallocated in the same clock phase Ph1 that the value is written from the reorder buffer to the register file. Since this entry in the reorder buffer is now deallocated, subsequent references to the register C will result in a read from the register file instead of a speculative read from the reorder buffer. In this manner the architectural state of the microprocessor is truly reflected.

Figure 8:
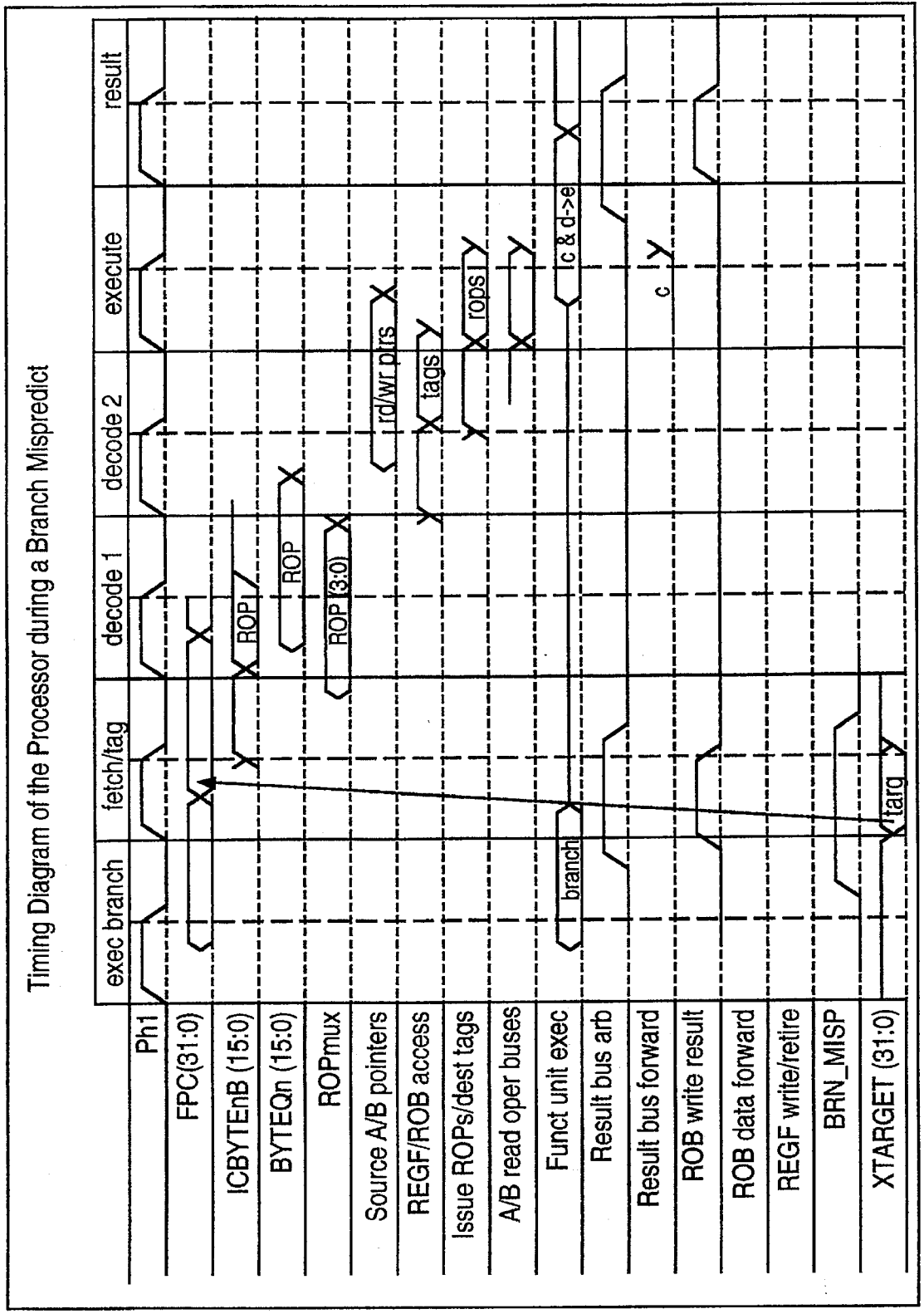
FIG. 8 is a timing diagram illustrating the operation of the microprocessor of the invention when a branch mispredict situation is encountered.

FIG. 8 depicts a timing diagram of processor 200 during a branch misprediction. The timing diagram of FIG. 8 shows the same signal types as the timing diagram of FIG. 7 with the following exceptions:

The BRN_MISP signal indicates when a branch misprediction has occurred.

The XTARGET (31:0) signal indicates the redirection address which the microprocessor now needs to fetch after a misprediction.

The timing diagram of FIG. 8 shows the stages of the microprocessor 200 pipeline during a branch misprediction and recovery. This timing diagram assumes that the first cycle is the execute cycle of the branch and that the following cycles are involved in correcting the prediction and fetching the new instruction stream. It is noted that in this particular embodiment, a three cycle delay exists from the completion of execution of the branch instruction that was mispredicted to the beginning of execution of a corrected path.

The fetch stage of the pipeline depicted in FIG. 8 is similar to the normal fetch stage depicted in FIG. 7 with the exception that the XTARGET (31:0) bus is driven from branch functional unit 235 to instruction cache 210 in order to provide instruction cache 210 with information with respect to the actual target. It is noted that the branch functional unit is the block of microprocessor 200 which determines that a branch mispredict has in fact occurred. The branch functional unit also calculates the correct target. This target is sent at the same time as a result is returned to the reorder buffer with a mispredicted status indication on result bus 280. The result bus also contains the correct PC value for updating the EIP register upon retiring the branch instruction if a real branch has occurred. The XTARGET bus is then driven on to the fetch PC bus and the instruction cache arrays are accessed. If a hit occurs, the bytes are driven to the byte queue as before.

When a misprediction occurs, all bytes in byte queue 215 are automatically cleared in the first phase of fetch with the assertion of the signal BRN_MISP. No additional ROPs are dispatched from decoder 205 until the corrected path has been fetched and decoded.

When the result status of a misprediction is returned in clock phase Ph1 of the fetch pipeline stage to the reorder buffer, the misprediction status indication is sent to all speculative ROPs after the misprediction so that they will not be allowed to write to the register file or to memory. When these instructions are next to retire, their entries in the reorder buffer are deallocated to allow additional ROPs to issue.

With respect to the decode1 pipeline stage during a branch misprediction, the rest of the path for decoding the corrected path is identical to the sequential fetch case with the exception of the updating of the prediction information in the ICNXTBLK array of instruction cache 210. The correct direction of the branch is now written to the prediction array ICNXTBLK to the cache block therein where the branch was mispredicted.

The pipeline stages decode2, execute, result, retire during a misprediction appear substantially similar to those discussed in FIG. 7.

More detailed information with respect to superscalar microprocessor operation is found in the copending patent application entitled "High Performance Superscalar Microprocessor" by David B. Witt and William M. Johnson, Ser. No. 08/146,382, filed Oct. 29, 1993, the disclosure of which is incorporated herein by reference. The cited patent application is assigned to the assignee of the subject patent application.

IV. Flag Operand Renaming And Forwarding

Microprocessor 200 includes a flag register 400 designated EFLAGS in FIG. 2. A detailed representation of the EFLAGS register 400 is shown in FIG. 9. EFLAGS register 400 is 32 bits wide of which bits 1,3,5,15 and 19–31 are reserved. The defined bits and bit fields within the EFLAGS register control certain operations and indicate the status of microprocessor 200. The lower 16 bits (bits 15-0) of the EFLAGS register contain the 16 bit register name FLAGS which are most useful when executing 8086 and 80286 code. EFLAGS register 400 includes a carry flag CF (bit 0), a parity flag PF (bit 2), an auxiliary carry flag AF (bit 4), a zero flag ZF (bit 6), a sign flag SF (bit 7), a trap flag TF (bit 8), an interrupt enable flag IF (bit 9), a direction flag DF (bit 10), an overflow flag OF (bit 11) and a resume flag RF (bit 16). Of these flags, the 6 primary status flags are OF, SF, ZF, AF, PF and CF. The six primary status flags are updated as a consequence of most integer operations and are used to generate the conditions for branch instructions.

Conditional branch instructions are often in the form Jcc, or jump on condition code "cc", wherein cc represents flags or condition codes. For example, the branch instruction JNZ 3A26 means jump to a predetermined address 3A26 if the zero flag (ZF) is zero. The branching decisions associated with other conditional branch instructions depend on the present value of other flags such as OF, SF, AF, PF and CF, for example. In order for a conditional branch instruction to execute, these flag values must be available. These flag values act as operands for the conditional branch instructions. Keeping in mind that these flags are updated and modified by most integer operations, it will be appreciated that microprocessor performance can be significantly negatively impacted when a particular branch instruction has to wait for the flags affected by a prior instruction to be updated so that the present branch can be executed.

To solve this problem, one embodiment of the invention treats the six status bits or flags OF, SF, ZF, AF, PF and CF of the EFLAGS register 400 as individual renamable resources for the benefit of branch functional unit 235. Reorder buffer 285 includes a reorder buffer array (ROB array) 405 which includes 16 entries which can be allocated to store results from the functional units or tags corresponding to not yet calculated results associated with instructions that have been dispatched and which are not yet executed. In accordance with the present invention, ROB array 405 includes a flag storage portion 410 (see FIG. 4) for storing flags which are associated with instructions which are speculatively executed. In other words, when an instruction's result is allocated one of the 16 entries of ROB array 405, an associated allocation is also made in flag storage portion 410 for those flags which are modified by such instruction.

Figure 10:
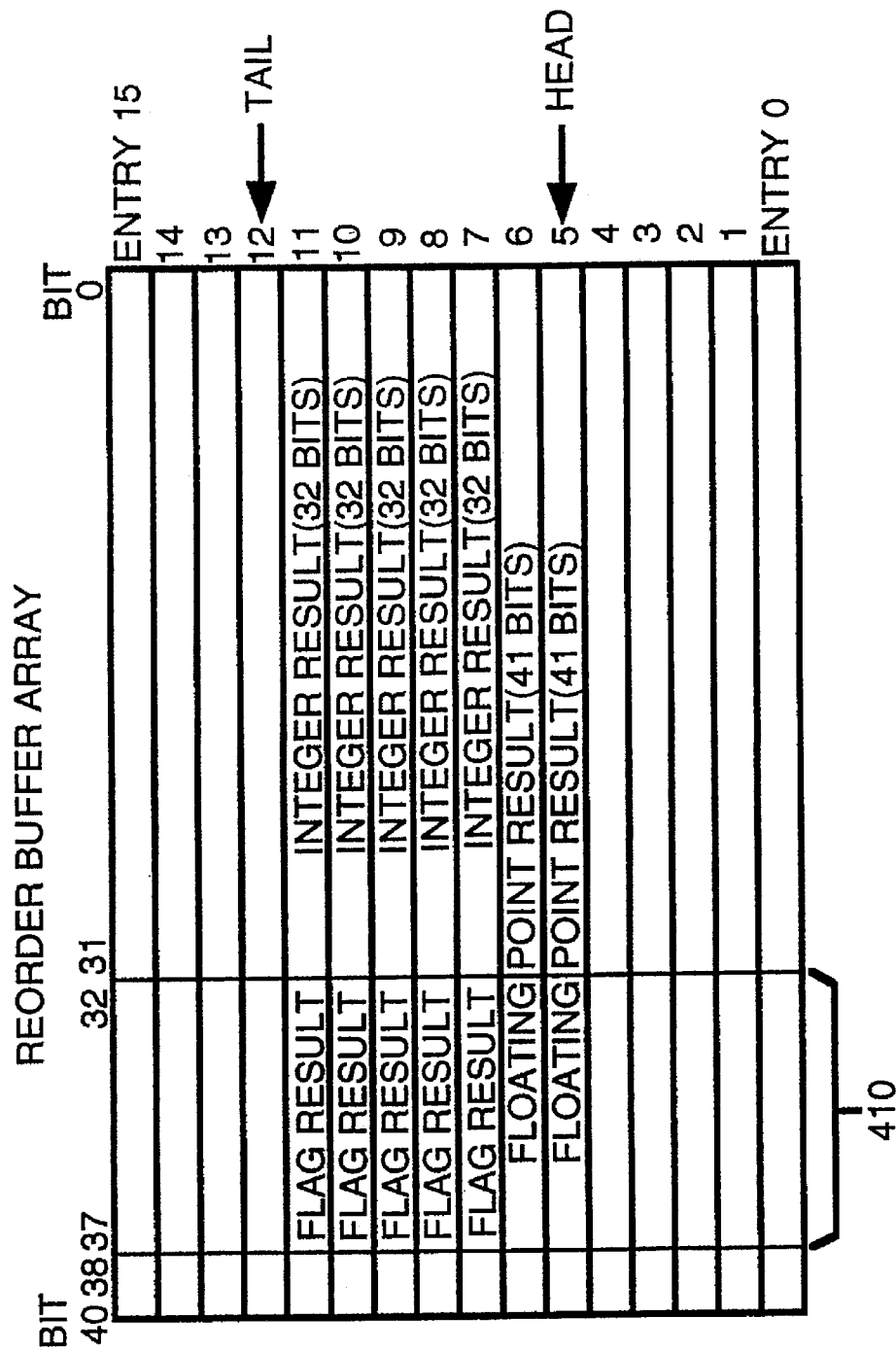
FIG. 10 is a more detailed representation of the reorder buffer array employed by the superscalar microprocessor of the invention.

FIG. 10 shows ROB array 405 and flag storage portion 410 thereof in more detail. As seen in FIG. 10, when a floating point ROP is dispatched, a 41 bit floating point entry is allocated in ROB array 405. For example, an entry such as entry 5 is allocated to the floating point ROP. This floating point ROP occupies the full 41 bit width of entry 5 as shown in FIG. 10. No flags are associated with such a floating point instruction. In this manner, the 41 bit floating point result of the dispatched floating point ROP is allocated an entry in ROB array 405. (In this particular example, entry 5 is at the head of the reorder buffer which contains the oldest entries of the reorder buffer. The newest entries of the reorder buffer are found at the tail thereof.)

However, when the dispatched ROP is an integer instruction, the 32 bit integer result of that integer ROP is allocated a 32 bit entry in ROB array 405. This 32 bit integer result entry, for example entry 11 in FIG. 10, occupies the lower bits, 0–31, of ROB array 405 as shown. The flags which can be affected by the dispatched integer ROP, namely flags OF, SF, ZF, AF, PF and CF which form the flag result of the ROP, are allocated the upper bits 32–37 associated with entry 11 as shown. In this manner, the upper bits of the integer ROP entry which are unused because the entry is not a wide floating point entry are advantageously used to store the flag updates associated with a particular integer result.

When an integer ROP result is first allocated an entry in ROB 285, the reorder buffer assigns tag values to the particular flag values which are affected by this particular ROP. When decoder 205 dispatches a subsequent ROP such as a branch instruction which requires those flag values as flag operands (the requested flags), ROB flag storage portion 410 sends the corresponding flag tags via flag tag buses 417 to branch functional unit 235. In this case, the flag tags are held in the reservation station of branch functional unit 235 until the actual flag values (the requested flags) arrive on bits 32:37 of one of the four general purpose result buses. The actual flag values are provided to the result bus by the particular integer functional unit, for example ALU0 or ALU1 which executes the ROP that causes these flags to be updated.

Alternatively, if the required flag values are already determined and stored in ROB flag storage portion 410 at the time when the ROP instruction is dispatched, the required flag values themselves are transmitted from ROB flag storage portion 410 over flag operand bus 415 to branch functional unit 235. Once flag values associated with a particular instruction are no longer speculative, namely when the instruction is retired from ROB 285 to register file 255, the flags corresponding to such retired instruction are likewise retired from ROB flag storage portion 410 to EFLAGS register 400.

If a branch instruction requiring one or more flag operands is dispatched by decoder 205 to branch functional unit 235 and there is no flag entry or flag tag in ROB flag storage portion 410 of the reorder buffer corresponding to the required operand flags, then the required flag operands are retrieved from the EFLAGS register 400 and sent to branch functional unit 235 by the same flag operand bus 415 described above.

A operand and B operand/flag selection block 290 assists in this flag transmission operation. More particularly, selection block 290 checks ROB 285 to determine if either the requested flag operands or flag tags corresponding thereto are present in ROB 285, and if so present, block 290 causes those flag operands to be sent to branch functional unit 235 via flag operand bus 415. However, if it is found that there is no flag operand or flag tag contained in ROB 285 which corresponds to the flag operands of a particular branch instruction, then the corresponding flag operand from EFLAGS register 400 is provided by selection block 290 to flag operand bus 415 for transmission to branch functional unit 325.

It is noted that flag operand bus 415 is 6 bits wide and thus includes a respective bit dedicated to each of the primary status flag bits OF, SF, ZF, AF, PF and CF. In this manner, either the requested flags can be transmitted from ROB 285 if speculative, or from EFLAGS register 400 if real, to branch unit 235 over 6 bit flag operand bus 415. Again, flag operand storage portion 410 contains flags associated with speculatively executed instructions and EFLAGS register 400 contains the real state of flags after retirement of associated instructions.

In one embodiment of the invention, the primary status bits of EFLAGS register 400 are subdivided into three sections or sub-groups according to which flag or flags are affected by updating. More specifically, the full group of flags which are potentially modified by a flag modifying instruction (the OF, SF, ZF, AF, PF and CF bits) is grouped into sub-groups as follows:

Sub-Group 1—the OF bit

Sub-Group 2—the SF, ZF, AF and PF bits

Sub-Group 3—the CF bit

In the X86 instruction set, the status flags are updated in the three independent groups listed above. X86 instructions can be classified according to their updates to each of these three flag groups. In other words, there are no X86 instructions which update the ZF flag without also updating or affecting the SF, AF and PF flag bits. In accordance with this embodiment of the present invention, microprocessor 200 views the renamable portion of the EFLAGS register as being composed of three sub-registers within flag storage portion 410, namely a first subregister including the OF bit, a second sub-register including the SF, ZF, AF and PF bits, and a third sub-register including the CF bit.

When instructions are dispatched by decoder 205 to the various functional units, these 3 sub-registers are updated according to the particular flags modified by the ROP being dispatched. Updates to flag sub-groups are scheduled in ROB 285 with a 3-bit flag update code for each of the four dispatch positions D0, D1, D2 and D3, one bit of the 3 bit code being dedicated to each flag sub-group. One three bit flag update code per ROP is provided by decoder 205 to indicate to ROB 285 which particular flags of the 6 bit EFLAGS register 400 are to be updated. Thus, for every four ROP's provided to dispatch positions D0, D1, D2 and D3, there are 4 respective flag update codes transmitted over a flag update code bus included in the ALLOC bus between decoder 205 and ROB 285.

In more detail, it is noted that the ALLOC bus is designated as follows:

Dispatch Position 0—ROBALLOC (3:0) wherein bit 3 denotes register writeback and bits (2:0) are flag update bits Dispatch Position 1—ROBALLOC (7:4) wherein bit 7 denotes register writeback and bits (6:4) are flag update bits Dispatch Position 2—ROBALLOC (11:8) wherein bit 11 denotes register writeback and bits (10:8) are flag update bits Dispatch Position 3—ROBALLOC (15:12) wherein bit 15 denotes register writeback and bits (14:12) are flag update bits The STATUS bus between decoder 205 and reorder buffer 285 is designated as follows:

ROBSTAT (3:0) indicates if reorder buffer 285 has room for the result of the ROP in each of the four dispatch positions of decoder 205.

A five bit wide READ FLAG bus 419 is coupled from decoder 205 to reorder buffer 285 and EFLAGS register 400. READ FLAG bus 419 includes a 2 bit READ FLAG POSITION bus on which decoder 205 transmits a 2 bit code which indicates the position of a branch ROP within the 4 position dispatch window. In this particular embodiment, one branch ROP is permitted per dispatch window. READ FLAG bus 419 also includes a 3 bit READ FLAG POINTER bus designated RDFLAGPTR(2:0), namely 3 enable bits (also known as hot bits) which indicate which of the three flag sub-groups are required as input operands for the subject branch ROP. More specifically, bit 0 of the READ FLAG POINTER bus indicates when the branch ROP within the dispatch window requires the flag Sub-Group 1 as an input operand. Bit 1 of the READ FLAG POINTER bus indicates when the branch ROP within the dispatch window requires the flag Sub-Group 2 as an input operand. And finally, bit 2 of the READ FLAG POINTER bus indicates when the branch ROP within the dispatch window requires the flag Sub-Group 3 as an input operand.

When the dispatched ROP executes in a functional unit, the flag updates caused thereby (ie. the result flags) are returned to ROB 285 on bits 37:32 of the result buses 280 since these bits are not otherwise used in integer operations. These result flags are stored as flag operands in flag operand storage portion 410 of ROB array 405 of reorder buffer 285. The integer result is also stored in the ROB array 405 along with the result flags associated therewith. When the ROP is retired, the data/flags result is driven out of ROB 285. More particularly, upon such retirement, the ROB entry corresponding to the ROP is retired from ROB 285 to register file 255 and to EFLAGS register 400 via the 41 bit writeback bus therebetween. At this time, the flags corresponding to the ROP are retired from flag operand storage portion 410 of ROB 285 to the EFLAGS register 400.

Bits 37:32 of result buses 280 are thus used for transmitting flag operands from the functional units to branch unit 235. Moreover, bits 37:32 of result buses 280 are also used for transmitting flag operands from the functional units back to flag storage portion 410 of reorder buffer 285.

More detail is now provided with respect to flag operand bus 415 and the three flag tag buses 417. Flag operand bus 415 is a 6 bit bus which is divided into three bus portions 415A, 415B and 415C wherein bus portion 415A includes bit 0 for transmission of flag operand Subgroup 1, bus portion 415B includes bit 4:1 for transmission of flag operand Subgroup 2, and bus portion 415C includes bit 5 for transmission of flag operand Subgroup 3. Bus portions 415A, 415B and 415C are shown collectively as flag operand bus 415 in FIG. 2. Each of the three bus portions 415A, 415B and 415C has a respective 4 bit flag tag bus 417 corresponding thereto. Thus, the total bandwidth of the three flag tag buses is 12 bits.

For example purposes, it is now assumed that a branch instruction which requires the CF bit as a flag operand is dispatched to branch unit 235. If the CF bit is currently stored in flag storage portion 410 of ROB 285 (as in the case of a resolved dependency), then the CF bit is transmitted over flag operand bus 415, namely over bus portion 415C which transmits Subgroup 3. However, if an unresolved dependency still exists, then a 4 bit flag tag is transmitted over flag tag bus 417 to indicate to branch unit 235 the particular entry number or destination within flag storage portion 410 of ROB 285 which has been allocated to this particular flag operand. It is noted that this flag renaming scheme allows for the number of renamable flag entities (three in this particular embodiment) to be less then the total number of primary status flag operands (six in this embodiment). In this particular example, the renamable entity is the single flag of flag Subgroup 3.

For purposes of an alternative example, it is now assumed that a branch instruction which requires the SF, ZF, AF and PF bits as flag operands is dispatched to branch unit 235. If the SF, ZF, AF and PF bits are stored in flag storage portion 410 of ROB 285 (as in the case of a resolved dependency), then these flag operand bits are transmitted over flag operand bus 415, namely over bus portion 415B which transmits Subgroup 2. However, if dependencies still exist, then a single 4 bit flag tag is transmitted over flag tag bus 417 to indicate to branch unit 235 the particular entry number within flag storage portion 410 of ROB 285 which has been allocated to this particular flag operand. It is noted that a single tag accommodates all four flags of Subgroup 2 in this example. In this example, the renamable entity is all of Subgroup 2.

Figure 11:
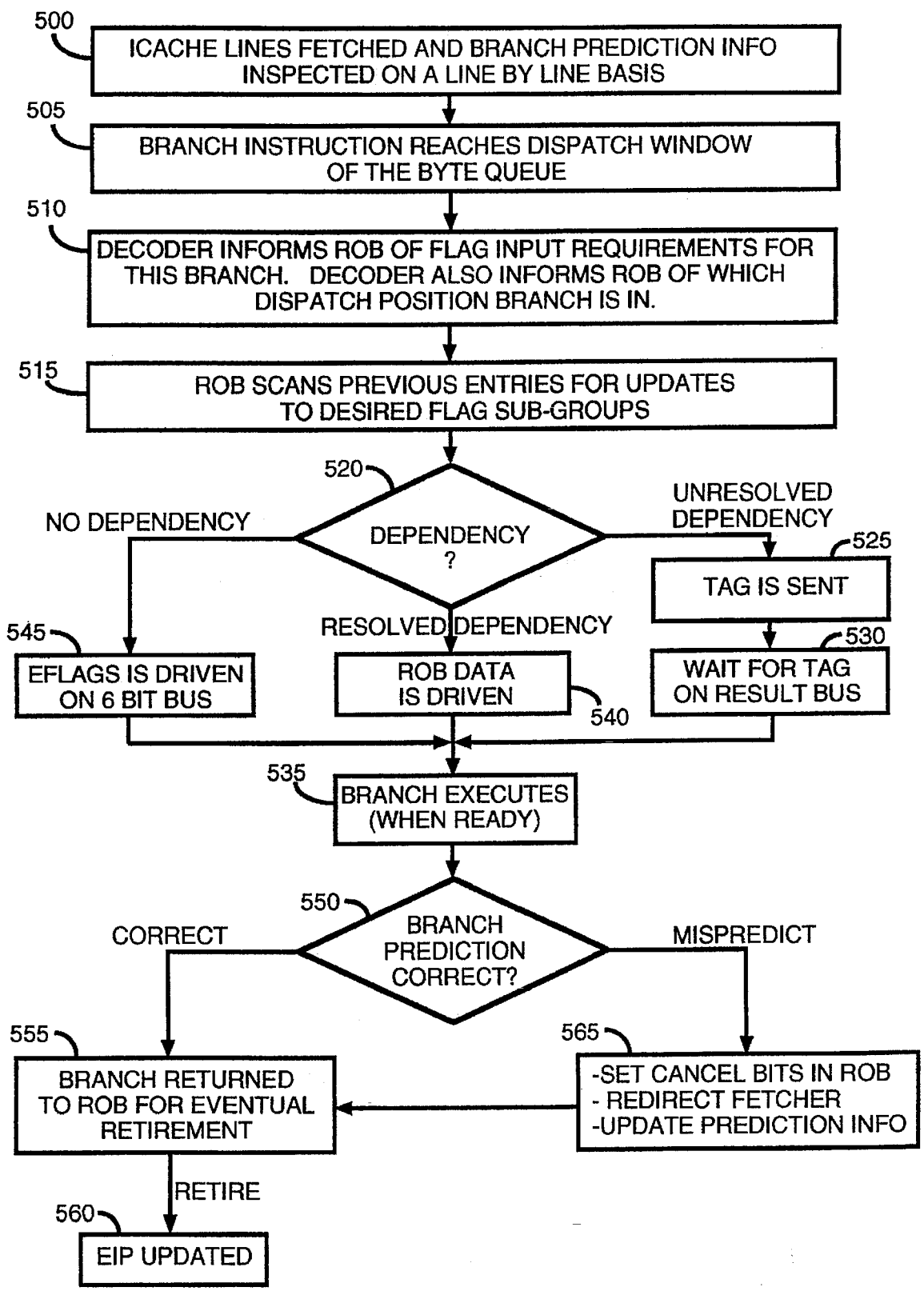
FIG. 11 is a flowchart depicting the overall operation of the microprocessor of the present invention in a situation where a branch instruction is encountered.

FIG. 11 is a flowchart which depicts the overall operation of the flag renaming and forwarding mechanism in microprocessor 200. This flowchart depicts the operation of microprocessor 200 when it encounters a branch instruction after having executed prior instructions in a program instruction stream. As per block 500 of the flowchart of FIG. 10, instruction lines are fetched from instruction cache 200 and are provided to byte Q 215. The branch prediction information associated with each line is inspected on a line by line basis to ascertain any predicted branches. It is then assumed that a branch instruction reaches the dispatch window 220 associated with byte Q 215 as per block 505. Decoder 205 receives the branch instruction from byte Q 215 and decodes the branch instruction. Upon decoding the branch instruction, decoder 205 informs reorder buffer 285 of the flag input requirements of the particular decoded branch instruction. For example, if the decoded branch instruction is JO 4B32 (or jump on overflow to the instruction at address 4B32), then, in block 510, decoder 205 informs reorder buffer 285 that this instruction must have access to the overflow flag, OF, which is a Group 1 status flag.

More specifically, read flag bus 419 (READ FLAG) is coupled between decoder 205 and reorder buffer 285 as shown in FIG. 2. This READ FLAG bus informs reorder buffer 285 of the input requirements of the current branch, namely, the branch that is presently being allocated. This READ FLAG bus also communicates the position of the current branch within the dispatch window to reorder buffer 285. The READ FLAG bus is also coupled to EFLAGS register 400 to drive out the requested flags if such flags have been retired thereto and provided the requested flag or corresponding flag tag is not present within reorder buffer 285. The flag or flags which a particular branch instruction needs in order to be executed in the branch functional unit are called the requested flag or requested flags.

Reorder buffer 285 then scans the entries of the ROB flag operand storage portion 410 for the most recent update to the flag sub-group associated with the requested flag or flags as per block 515. A test is then conducted by reorder buffer 285 to determine if a dependency exists with respect to the particular requested flag or flags. The dependency check is performed with respect to the group of which the requested flag or flags are a member as per decision block 520. As seen in FIG. 4, ROB 285 includes three dependency checkers 420A, 420B and 420C, namely, one dependency checker for each of the three flag subgroups. Each dependency checker checks to determine if a dependency is associated with any of the flags of the flag sub-group assigned to that checker. One dependency checker which can be employed as dependency checkers 420A, B and C is disclosed in the U.S. patent application entitled "A Range Finding Circuit Using Circular Carry Lookahead", inventor Scott White, Ser. No. 08/233,568, filed Apr. 26, 1994, which is assigned to the same assignee as the subject invention and which is incorporated herein by reference.

The flag grouping arrangement of the present invention advantageously permits a reduction in the number of dependency checkers that would otherwise be required. For example, without flag grouping, it is possible that a number of dependency checkers equal to the number of flags would be required. In other words, if there are 6 flags to be renamed and forwarded, then 6 dependency checkers could be needed.

If there is an unresolved dependency with respect to the requested flag(s) sub-group, then a flag tag is sent to branch functional unit 235 in place of the actual flag sub-group as per block 525 of the flowchart of FIG. 11. In other words, if the values of the flags in the requested flag group have not yet been determined because such flags are still associated with an instruction which is waiting in a functional unit to be executed, then the requested flag values have not yet been determined and reported back to the reorder buffer. In this case, instead of sending the actual flag values, the reorder buffer sends a flag tag for the particular flag sub-group that was requested by the decoder.

Branch functional unit 235 then waits for the requested tag to appear on the result tag bus 282. Subsequently, a particular functional unit executes an instruction associated with the requested tag. That particular functional unit then outputs the requested tag to one of result tag buses 282 to signal that the requested flag information associated with that tag is now available on result bus 280. When branch functional unit 235 receives a tag for the requested flag operand sub-group, the requested flag information for that subgroup is forwarded from the functional unit which updated such flags to the branch functional unit 235 via result bus 280. Branch functional unit 235 then executes the pending branch instruction as per block 535.

However, returning to decision block 520, if a determination is made that any dependencies with respect to the requested flag group have been resolved, then at block 535 reorder buffer 285 transmits the requested flag sub-group to branch functional unit 235 for speculative execution as per block 535. It is noted that if branch functional unit 235 requires flag sub-group 2 to execute a particular branch instruction, then all four flags (SF,ZF, AF and PF) of sub-group 2 are sent to branch unit 235. However, if the remaining sub-groups 1 and 3 are not needed by branch unit 235 to executed a particular instruction, then they need not be sent. In other words, in one particular embodiment, the requested flag sub-group or sub-groups are sent to branch unit 235. Not all sub-groups need be sent to branch unit 235 for each instruction executed thereby.

Returning again to decision block 520, if a determination is made that no dependency exists with respect to the flag sub-group requested by decoder 205 for a particular branch instruction, then the contents of EFLAGS register 400 are transmitted to branch functional unit 235 over the 6 bit flag operand bus 415 as per block 545. Again, just the flag operands from the requested flag sub-group need be sent from EFLAGS register 400 to branch unit 235. The instruction is then executed in the branch functional unit 235 as per block 535.

A determination is then made at decision block 550 as to the correctness of the branch prediction. If the branch prediction is found to be correct, then the result of the branch is returned to ROB 285 at block 555. In other words, the new EIP value (if the branch is taken) and taken/not taken status information is reported back to ROB 285. Since the branch was correctly predicted in this example, the branch is no longer speculative and accordingly the branch is retired from ROB 285 to register file 255. Concurrent with such retirement, the EIP (extended instruction pointer stored in the EIP register in retire logic 325) or retire PC is updated to reflect that the branch instruction is retired. When a non-branch instruction is retired, the EIP value is updated to the next instruction after the retired instruction. However, when a branch instruction is retired, the EIP register is updated to the target branch address. More specifically, when a branch instruction is retired, then the EIP is updated to the target branch address if the branch instruction was a taken branch. However, in the case of a non-taken branch, the EIP is incremented to the next instruction following the branch instruction.

If once the branch instruction has executed it is determined at decision block 550 that a branch misprediction has occurred, then in block 565 entries in ROB 285 subsequent to the mispredicted branch are discarded since they were in process due to incorrect speculation. In this event, the prediction information in instruction cache 210 is updated and the fetcher, FPC 213, is redirected to restart fetching at the correct target address. Upon execution the mispredicted branch instruction is returned to ROB 285 for retirement. The flowchart described above represents one trip through the microprocessor pipeline. It should be understood that execution of the pipeline is a continuous process with the multiple different stages thereof being carried out concurrently.

It is noted that flag forwarding is also used by SETcc instructions, which are executed in branch functional unit 235. These instructions use EFLAGS bits as input operands in a manner similar to branch instructions. However, instead of branching, the SETcc instructions generate a 0 or 1 byte result. Unlike branches, this result is returned on a general purpose result bus 280 from which it can be forwarded to other functional units. The result is also supplied to ROB 285 via result bus 280. In this manner, SETcc instructions can avoid undesired serialization effects.

While flag storage portion 410 has been shown as being located within reorder buffer 285 in one embodiment of the invention, it should be understood that flag storage portion 410 may be located externally to reorder buffer 285 as well.

While a microprocessor apparatus is described above, it is clear that a method for operating such apparatus has also been disclosed. Briefly, the method involves a superscalar microprocessor including a decoder for decoding multiple instructions per microprocessor cycle and a reorder buffer coupled to the decoder, the reorder buffer being further coupled to a register file and a plurality of functional units including a branching unit. In particular, the method of processing instructions in a superscalar microprocessor includes the step of decoding instructions supplied to the microprocessor in an instructions stream and translating decoded instructions into ROPs. The method also includes the step of dispatching a flag-modifying ROP to one of the functional units designated as the target functional unit. The method further includes the step of allocating a first memory location in the reorder buffer for the data result of the flag-modifying ROP. The method also includes the step of allocating a second memory location in the reorder buffer for storing flag information which is updated when the flag-modifying ROP is executed. One embodiment of the method includes the further step of associating a flag tag with the second memory location when the flag modifying ROP is pending execution, such flag tag corresponding to the flag result of the flag modifying ROP.

The foregoing has described a superscalar microprocessor which includes flag renaming and forwarding mechanisms. In one particular embodiment of the invention, the flags are advantageously grouped to lessen the number of dependency checkers that are needed. The microprocessor exhibits enhanced performance with respect to execution of instructions which are dependent on flags for execution. Advantageously, instead of using 4 read flags busses and six dependency checkers to achieve flag renaming and forwarding, fewer of these structures can be employed.

While only certain preferred features of the invention have been shown by way of illustration, many modifications and changes will occur. It is, therefore, to be understood that the present claims are intended to cover all such modifications and changes which fall within the true spirit of the invention.

What is claimed is:

1. A superscalar microprocessor comprising:
   a decoder for decoding instructions contained in an instruction stream and translating decoded instructions into ROPs;
   a reorder buffer, coupled to the decoder, for storing the speculative state of the microprocessor;
   a register file, coupled to the reorder buffer, for storing the real state of the microprocessor;
   the reorder buffer including a reorder buffer array having a plurality of storage locations which include an integer result portion for storing a speculative integer result and a flag result portion for storing speculative flag information associated with the integer result, the flag result portion and the integer result portion being concatenated to form a floating point storage location which accommodates storage of floating point results which are wider than the integer results; and
   a real flags register, coupled to the reorder buffer, for storing flag information which is retired from the reorder buffer.

2. The microprocessor of claim 1 further comprising:
   a floating point unit coupled to the decoder and the reorder buffer;
   a branch unit coupled to the decoder and the reorder buffer; and
   an integer unit coupled to the decoder and the reorder buffer.

3. The microprocessor of claim 2 wherein the decoder further comprises a dispatch window for dispatching.. flag-modifying ROPs to the integer unit and for dispatching branch ROPs to the branch unit and for dispatching floating point ROPs to the floating point unit, the integer unit producing an integer result when an integer ROP executes therein, the floating point unit producing a floating point result when a floating point ROP executes therein.

4. The microprocessor of claim 3 wherein the reorder buffer includes renaming means for allocating one of the flag result portions of the reorder buffer to the flag result of a particular flag-modifying ROP dispatched by the decoder, thus producing an allocated flag result portion.

5. The microprocessor of claim 4 wherein the renaming means further comprises means for associating a flag tag with the allocated flag result portion while execution of the flag modifying ROP corresponding to the allocated flag result portion is pending.

6. The microprocessor of claim 5 further comprising a flag tag bus, coupled between the reorder buffer and the branch unit, for communicating flag tags from the reorder buffer to the branch unit.

7. The microprocessor of claim 6 further comprising a flag operand bus, coupled between the reorder buffer, the real flags register and the branch unit, for communicating flag results from the reorder buffer and the real flags register to the branch unit.

8. The microprocessor of claim 7 wherein the flag result portion exhibits a plurality of flag bit positions for storing a plurality of flags, said plurality of flags being grouped into flag sub-groups according to which flags are updated together when a flag modifying ROP executes.

9. The microprocessor of claim 8 further comprising means for associating a flag tag with a particular flag sub-group.

10. The microprocessor of claim 9 further comprising a plurality of flag tag busses equal in number to the number of flag sub-groups, the flag tag buses being coupled between the flag result portion of the reorder buffer and the branch unit, each flag tag bus communicating a respective flag sub-group to the branch unit.

11. The microprocessor of claim 10 further comprising a plurality of dependency checkers, a respective dependency checker being provided for each of the flag sub-groups to determine if any dependencies exist with respect to the instructions associated with the flags of a sub-group.

12. The microprocessor of claim 2 wherein the flag result portion exhibits a plurality of flag bit positions for storing a plurality of flags, said plurality of flags being grouped into flag sub-groups according to which flags are updated together when a flag modifying ROP executes.

13. The microprocessor of claim 12 further comprising means for associating a flag tag with a particular flag sub-group.

14. The microprocessor of claim 13 further comprising a plurality of flag tag busses equal in number to the number of flag sub-groups, the flag tag buses being coupled between the flag result portion of the reorder buffer and the branch unit, each flag tag bus communicating a respective flag sub-group to the branch unit.

15. The microprocessor of claim 14 further comprising a plurality of dependency checkers, a respective dependency checker being provided for each of the flag sub-groups to determine if any dependencies exist with respect to the instructions associated with the flags of a sub-group.

16. The microprocessor of claim 2 further comprising a result bus coupling the branch unit, the integer unit, the floating point unit and the reorder buffer together.

17. The microprocessor of claim 16 wherein the result bus exhibits a total data width equal to the width of floating point results such that floating point results can be transmitted on the total width of the result bus, the result bus including an integer result portion for transmitting integer results exhibiting a data width less than the data width of floating point results and a further including a remaining flag result portion for transmitting flag results associated with an integer result of a flag modifying ROP.

18. The microprocessor of claim 1 combined with an external memory for providing instructions and data to the microprocessor.

19. The microprocessor of claim 2 combined with an external memory for providing instructions and data to the microprocessor.

20. A superscalar microprocessor comprising:
a decoder for decoding instructions contained in an instruction stream;
a reorder buffer, coupled to the decoder, for storing the speculative state of the microprocessor;
a register file, coupled to the reorder buffer, for storing the real state of the microprocessor;
the reorder buffer including a reorder buffer array having a plurality of storage locations which include an integer result portion for storing a speculative integer result and a flag result portion for storing speculative flag information associated with the integer result, the flag result portion and the integer result portion being concatenated to form a floating point storage location which accommodates storage of floating point results which are wider than the integer results; and
a real flags register, coupled to the reorder buffer, for storing flag information which is retired from the reorder buffer.

21. The microprocessor of claim 20 further comprising:
a floating point unit coupled to the decoder and the reorder buffer;
a branch unit coupled to the decoder and the reorder buffer; and
an integer unit coupled to the decoder and the reorder buffer.

22. The microprocessor of claim 21 wherein the decoder further comprises a dispatch window for dispatching flag-modifying instructions to the integer unit and for dispatching branch instructions to the branch unit and for dispatching floating point instructions to the floating point unit, the integer unit producing an integer result when an integer instruction executes therein, the floating point unit producing a floating point result when a floating point instruction executes therein.

23. The microprocessor of claim 22 wherein the reorder buffer includes renaming means for allocating one of the flag result portions of the reorder buffer to the flag result of a particular flag-modifying instruction dispatched by the decoder, thus producing an allocated flag result portion.

24. The microprocessor of claim 23 wherein the renaming means further comprises means for associating a flag tag with the allocated flag result portion while execution of the flag modifying instruction corresponding to the allocated flag result portion is pending.

25. The microprocessor of claim 24 further comprising a flag tag bus, coupled between the reorder buffer and the branch unit, for communicating flag tags from the reorder buffer to the branch unit.

26. The microprocessor of claim 25 further comprising a flag operand bus, coupled between the reorder buffer, the real flags register and the branch unit, for communicating flag results from the reorder buffer and the real flags register to the branch unit.

27. The microprocessor of claim 20 combined with an external memory for providing instructions and data to the microprocessor.

28. The microprocessor of claim 21 combined with an external memory for providing instructions and data to the microprocessor.

29. In a superscalar microprocessor including a decoder for decoding multiple RISC-like operations ("ROPs") per microprocessor cycle and a reorder buffer coupled to the decoder, the reorder buffer being further coupled to a register file and a plurality of functional units including a branching unit, the reorder buffer storing the speculative state of said microprocessor, the register file storing the real state of said microprocessor, a method of processing ROPs comprising the steps of:
decoding instructions supplied to the microprocessor in an instructions stream and translating decoded instructions into ROPs;
dispatching a flag-modifying ROP to one of the functional units designated as the target functional unit;
allocating a first memory location in the reorder buffer for the data result of the flag-modifying ROP; and
allocating a second memory location in the reorder buffer for storing flag information which is updated when the flag-modifying ROP is executed.

30. The method of claim 29 further comprising the step of associating a flag tag with the second memory location when the flag modifying ROP is pending execution, the flag tag corresponding to the flag result of the flag modifying ROP.

31. The method of claim 30 further comprising the step of dispatching a branch ROP to the branching unit, the branch ROP having the flag result of the flag-modifying ROP as a flag operand of the branch ROP.

32. The method of claim 31 further comprising the steps of:

executing the flag modifying ROP by the target functional unit; and sending the flag result of the flag modifying ROP from the target functional unit to the reorder buffer for storage in the second memory location.

33. The method of claim 32 further comprising the step of sending a flag result from the reorder buffer to the branch unit via a flag operand bus therebetween.

34. The method of claim 33 further comprising the steps of:

executing the flag modifying ROP by the target functional unit; and sending the flag result of the flag modifying ROP from the target functional unit over a result bus to the branch unit for use by the branch unit as a flag operand of the branch ROP dispatched to the branch unit.

35. The method of claim 34 wherein the result bus exhibits a width sufficient to accommodate a floating point result, the width of an integer result being less than that of a floating point result, the method further comprising the steps of:

transmitting an integer result from an integer functional unit onto a first portion of the result bus; and transmitting a flag result from an integer functional unit onto a remaining second portion of the result bus.

36. The method of claim 29 further comprising the steps of:

executing an integer ROP by one of the functional units to produce an integer result exhibiting a first data width, executing a floating point ROP by another of the functional units to produce a floating point result exhibiting a second data width greater than the first data width.

37. The method of claim 36 further comprising the step of storing an integer result in the first memory location.

38. The method of claim 37 further comprising the step of storing flag results in the second memory location.

39. The method of claim 36 wherein the first memory location and the second memory location in the reorder buffer together form a floating point result memory location, the method including the step of storing a floating point result in the floating point memory location.

40. The method of claim 30 further comprising the step of communicating a flag tag associated with the second memory location in the reorder buffer to the branch functional unit via a flag tag bus.

41. The method of claim 30 wherein the flag information stored in the second memory location of the reorder buffer includes a plurality of flags, the method further comprising the step of grouping the flags into sub-groups according to which flags are updated together when a flag modifying ROP executes.

42. The method of claim 30 further comprising the step of providing a respective flag tag to each flag sub-group.

43. The method of claim 30 further comprising the step of providing a respective flag tag bus between the reorder buffer and the branch unit for each flag subgroup.

44. The method of claim 29 further comprising the step of dispatching a branch ROP to the branch unit to provide a dispatched branch ROP.

45. The method of claim 44 further comprising the step of transmitting requested flag information for the dispatched branch ROP to the reorder buffer and the real flags register.

46. The method of claim 45 further comprising the steps of retiring flag information from the reorder buffer when such flag information becomes non-speculative; and storing this retired flag information in the real flags register upon retirement.

47. The method of claim 46 further comprising the step of transmitting a real flag from the real flags register to the branch functional unit as a flag operand when no requested flag or flag tag therefor is available from the reorder buffer.

48. The method of claim 46 further comprising the step of transmitting a flag tag from the reorder buffer to the branch unit when the value of the requested flag is still being determined by another functional unit.

49. The method of claim 46 further comprising the step of transmitting a flag from the reorder buffer to the branch unit with the requested flag is stored in the reorder buffer and the requested flag value is still speculative.

50. The method of claim 29 further comprising the steps of providing a real flags register coupled to the reorder buffer and the functional units for storing the real state of flags updated by the functional units.

* * * * *

UNITED STATES PATENT AND TRADEMARK OFFICE
CERTIFICATE OF CORRECTION

PATENT NO. : 5,632,023
DATED : May 20, 1997
INVENTOR(S) : Scott A. White, David S. Christie, and Michael D. Goddard It is certified that error appears in the above-identified patent and that said Letters Patent is hereby corrected as shown below:

Col. 36, line 40, delete "..".

Signed and Sealed this

Eighteenth Day of November 1997

Attest:

BRUCE LEHMAN

*Attesting Officer*  *Commissioner of Patents and Trademarks*